(12) United States Patent
Abdo

(10) Patent No.: US 8,806,320 B1
(45) Date of Patent: Aug. 12, 2014

(54) SYSTEM AND METHOD FOR DYNAMIC AND AUTOMATIC SYNCHRONIZATION AND MANIPULATION OF REAL-TIME AND ON-LINE STREAMING MEDIA

(75) Inventor: Gaith Abdo, Silver Spring, MD (US)

(73) Assignee: Cut2It, Inc., Columbia, MD (US)

( * ) Notice: Subject to any disclaimer, the term of this patent is extended or adjusted under 35 U.S.C. 154(b) by 1175 days.

(21) Appl. No.: 12/181,314

(22) Filed: Jul. 28, 2008

(51) Int. Cl.
*G06F 17/00* (2006.01)
*G06F 17/30* (2006.01)

(52) U.S. Cl.
CPC .............................. *G06F 17/30017* (2013.01)
USPC ........... 715/203; 715/221; 715/222; 715/223; 715/224; 715/230; 715/233; 715/255; 715/277; 715/730; 715/731

(58) Field of Classification Search
CPC .................................................. G06F 17/30017
USPC ......... 715/221–224, 230, 233, 255, 277, 730, 715/731
See application file for complete search history.

(56) References Cited

U.S. PATENT DOCUMENTS

| | | | | |
|---|---|---|---|---|
| 5,579,466 A * | 11/1996 | Habib et al. | ................... | 715/210 |
| 5,760,767 A * | 6/1998 | Shore et al. | ................... | 715/723 |
| 5,832,171 A * | 11/1998 | Heist | .............................. | 386/241 |
| 6,243,676 B1 * | 6/2001 | Witteman | ...................... | 704/243 |
| 6,725,219 B2 * | 4/2004 | Nelson et al. | .................. | 707/770 |
| 7,296,023 B2 * | 11/2007 | Geyer et al. | ........................... | 1/1 |
| 7,634,175 B2 * | 12/2009 | Seo et al. | ...................... | 386/241 |
| 7,870,488 B2 * | 1/2011 | Kirkpatrick | .................... | 715/720 |
| 7,913,155 B2 * | 3/2011 | Basson et al. | ................. | 715/203 |
| 2003/0061280 A1 * | 3/2003 | Bulson et al. | ................. | 709/203 |
| 2004/0210845 A1 * | 10/2004 | Paul et al. | ..................... | 715/731 |
| 2006/0199161 A1 * | 9/2006 | Huang | ...................... | 434/307 A |
| 2006/0274214 A1 * | 12/2006 | Carro | ........................... | 348/722 |
| 2006/0277453 A1 * | 12/2006 | Smith et al. | ................ | 715/500.1 |

OTHER PUBLICATIONS

Steele et al., "Teach Yourself Microsoft Office Word in 24 Hours", published: Sep. 19, 2003, p. 1.*

* cited by examiner

*Primary Examiner* — Stephen Hong
*Assistant Examiner* — Wilson Tsui

(57) ABSTRACT

The present invention relates generally to a system that creates a real-time collaboration and synchronization of multiple, disparate media components, and more particularly to a system that creates dynamic relations and includes notations and annotations in text, audio, video, bookmark, and marked area without affecting the integrity of the original media source making it possible to later search any of these components independently using regular text search or further phonetic and image recognition searches.

8 Claims, 26 Drawing Sheets

FIG. 18

Auto Transcript

Disclaimer: The accuracy of the generated transcripts will depend on the recording quality, background noise, etc.

In order to get best results for your transcript, you will need to answer a few questions related to the media.

Title: [Review Guidelines]

Select media dialect

[US English ▸]

Select media used for recording media

[BestMatch Array ▸]

Does your media belong to medical industry?
○ Yes  ● No

[Auto Transcript]  [Cancel]

SYSTEM AND METHOD FOR DYNAMIC AND AUTOMATIC SYNCHRONIZATION AND MANIPULATION OF REAL-TIME AND ON-LINE STREAMING MEDIA

CROSS-REFERENCE TO RELATED APPLICATIONS

This application claims benefit of priority to U.S. Provisional Patent Application Nos. 60/935,099 and 60/935,100, both filed on Jul. 26, 2007 and both of which are herein incorporated in their entireties by reference.

FIELD OF THE INVENTION

The present invention relates generally to a system that creates a real-time collaboration and synchronization of multiple, disparate media components, and more particularly to a system that creates dynamic relations and includes notations and annotations in text, audio, video, bookmark, and marked area without affecting the integrity of the original media source making it possible to later search any of these components independently using regular text search or further phonetic and image recognition searches.

BACKGROUND

In general, the growth of digital multimedia content has skyrocketed as it has been fueled by the rapid expansion of broadband connectivity and increasing interest in online multimedia-rich applications. Numerous applications related to entertainment, e-commerce, digital photos, music download, and distance learning are now widely used by businesses and consumers. This growth is driving new forms of interaction with unstructured information in image, audio, video, and text formats. It is also compounding the need for more effective methods for searching, categorizing, organizing, and interacting with this information. Manual processing is expensive, time consuming, and inadequate; leading to incomplete and inconsistent results and poor performance. New technologies are clearly needed for creating new value by exploiting the growing archives of digital media assets and managing the high costs associated with cataloging digital media content.

For example, one such existing system is Synchrotext Version 1.0, which was developed by the Smithsonian Folkways Recordings. Synchrotext Version 1.0 is an annotated-media producer/player that synchronizes digital audio and video with scrolling transcriptions, translations and multimedia commentaries. Synchrotext version 1.0 application has two primary components, a publisher and a player, and was created using Macromedia Director MX 2004. The publisher is used to import media, transcription, and translation then manually synchronize and annotate the same for viewing in the player. The original intent of the current software was in the field of cultural protection, whereby Audio (songs)/Video (theatre, dance) etc. can be transcribed, translated, annotated, and manually synchronized for educational use, e.g., African ballads.

Synchrotext Version 1.0 application also provides an editor with a tool to combine recorded performances with transcriptions, translations, and commentaries by experts. Synchrotext Version 1.0 is a useful tool for presenting performances, analyzing them, storing information about them, and collaborating with others in their interpretation. It is perceived as useful in a variety of fields, including oral history, oral literature, visual anthropology, performance studies, film history, language instruction, and distance learning. In fact, the software is currently being used by an oral history museum in Brazil and a language research institute in Tanzania. In addition, Alexander Street Press, a compiler of online libraries for universities and agent for Smithsonian Global Sound, is developing libraries of Synchrotext works, including traditional oral narrative.

Diagrammatic Representation of Flow. FIG. 1 presents a process workflow 5 used in the Synchrotext application version 1.0 to synchronize digital audio and video with scrolling transcriptions, translations and multimedia commentaries. In FIG. 1, the basic steps that are part of the workflow of creating a Synchrotext work, along with the inputs for each step, are shown. To start the process, a user creates (10) a library for the synchronized work and enters a name/title 12 for the work. The user then requests that the system create (20) the work and enters a file name 22 of an existing file to be used, a name of an editor 24 who is creating the work, an author/performers name 26 associated with the existing file to be used, and an associated library file 28. The user may then compose (30) the start screen for the work by entering a title 32, specifying an image 34 to be displayed on the start screen, and enters credits information 36 that is also to be displayed on the start screen. The user next composes (40) an introduction screen for the work by entering introduction text 42 for the work that will be displayed on the introduction screen. The user next imports (50) media to be synchronized in the work. This media includes MP3 files 52, MP4 files 54, Quicktime files 56, and Real Media files 58, all of which may be placed on a local machine/computer and/or on the Internet.

In the next step in the process in FIG. 1, the user selects (60) a layout for the work by selecting audio only 62, low resolution (lo-res) video 64, high resolution (hi-res) video 66, or kiosk video 68. After this, the user creates (70) a transcript for the work in a selected language 72 and using a selected/provided transcription text 74. The user then creates (80) a translation for the work in another selected language 82 and using a selected/provided translation text 84. The user then synchronizes (90) the media with the transcription and the translation by pressing the space bar 92 to manually sync the media and transcription and translation. The syncing may be fine-tuned to $\frac{1}{100}$ of a second 94. The user then creates (100) annotations for the work by assigning a 3-character code 102, a description 104, and a mediatype-text, link to audio/video files 106 to each annotation. The user may then preview (110) the work to determine the quality of the synchronization and other aspects of the work. If necessary, the user may edit by work by returning to one or more of the previous process steps. Ultimately, the user generally saves/stores the work in a digital storage media for future recall and use. Finally, after the work has been created and stored, the work may be published (120) for all to see and use.

Unfortunately, the program's present limited versatility and limitations prevent Synchrotext from being truly useful. These limitations include, but are not limited to, only being able to use a Rich text import format, not being able to use MusicXMl as a text import format, having only a limited number of supported media formats, not being able to sync many-to-many, and not being able to automatically synchronize the file.

System Requirements. The Synchrotext Version 1.0 is designed for execution on the following minimum system requirements. A PC-based system may include an Operating System (OS) Windows 2000, ME, XP or greater, 256 MB RAM or greater, a Pentium II processor operating at 500 mhz or greater, and a minimum of 500 MB disk space for application and media files. The software needed includes the following: a Macromedia Shockwave viewer; QuickTime 6.5 or greater (for use with QuickTime *.mov, *.mp3, *.mp4), and RealOne player (for use with *.rm). Likewise, a Macintosh-based Platform may include: System 10.1 or greater, 256 MB RAM or greater, a G4 or greater processor; and a minimum of 500 MB disk space for application and media files. The software needed includes the following Software: Macromedia Shockwave viewer, QuickTime 6.5 or greater (for use with QuickTime *.mov, *.mp3, *.mp4), and RealOne player (for use with *.rm).

Therefore, a new system that replaces and overcomes the existing deficiencies in Synchrotext Version 1.0 standalone application is needed for synchronizing digital multimedia files and streams with scrolling transcriptions, translations and multimedia commentaries over the Internet.

BRIEF DESCRIPTION OF THE DRAWINGS

FIG. 18 is a portion of an add media screen that may be used by individual users to upload and/or download media files, in accordance with an embodiment of the present invention.

FIG. 21 is an auto transcript creation screen that may be used by to automatically create transcripts from the audio portion of a media file, in accordance with an embodiment of the present invention.

DETAILED DESCRIPTION

Figure 1:
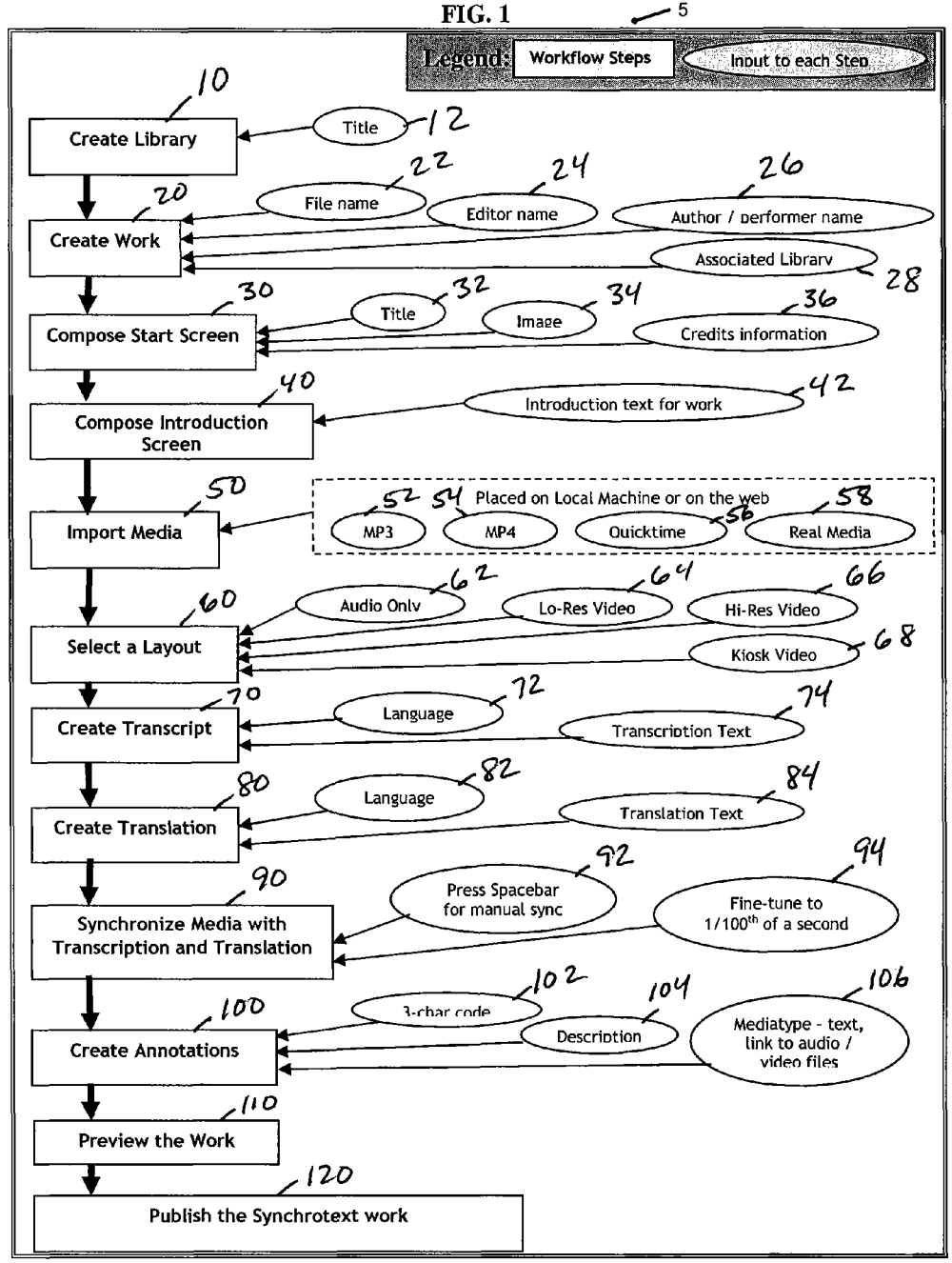
FIG. 1 is a flow chart of a method of operation of an existing system that synchronizes digital audio and video with scrolling transcriptions, translations and multimedia commentaries.

In accordance with one embodiment of the present invention, a system to create a real-time collaboration and synchronization of disparate media components may receive a document online, highlight part of the document and link the highlighted part to another document or a video/audio file. For example, one embodiment of the present invention may be found at the website with the following URL: http://www.viosync.com/viosyncbeta/quickguideNioSync_Beta.htm#General Features.html>>cap=VioSync>>pan=2>>pot=2>>pbs=toc|ndx|gls|nls>>pdb=toc, the content of which is hereby incorporated by reference in its entirety. Appendix A is attached hereto with printouts from the above website to illustrate one system, in accordance with an embodiment of the present invention. Examples of some screens from the system shown in Appendix A are provided and described herein in FIGS. 18 through 25.

Feature Set for New System. The following alternative systems and features are provided, at a minimum, in accordance with embodiments of the present invention.

Free Account in the Internet model. In accordance with one or more embodiments of the present invention, the free account may provide, but not limited to, the following features:

1. Manual Text Transcription
2. Manual Translation (one for each language)
3. Manual Transliteration (one for each language)
4. Manual Synchronization
5. Import System Work created using Synchrotext Publisher version 1.0
6. Support for limited media types—QuickTime, MP3, MP4, RealMedia, WMV, and WMA.
7. Support for basic annotation types—text, image, pre-recorded audio, video, and URL.
8. Support for advanced annotation types—recordable audio/video commentary (this allows for integrated recording without hampering the user's workflow), link to other System work via text/time anchors, and image/area maps.
9. Ability to apply basic formatting like bold, italic to text in transcription, translation, and annotation.
10. Ability to create groups and set permissions for the same
11. Custom Skins—This does not involve allowing users to change the logo. It will only allow custom color schemes, background, text styles etc. to be applied to the interface.
12. Customizable Layout by enabling/disabling or minimizing/maximizing certain components Premium Account in the Internet model. In accordance with one or more embodiments of the present invention, the Premium account may be customized by purchasing any combination from the following features, including, but not limited to:

1. Increased File-Size Limit for Uploaded media (100, 150, 200, 250, 300 . . . 600 MB)
2. Increased File-Duration Limit for uploaded media (20, 30, 40, 50 . . . 180 minutes)
3. Auto Transcription (User selects from a list available languages and rate)
4. Auto Translation (User selects from a list available languages and rate)
5. Auto Synchronization (User selects from a list available languages and rate)
6. Support for additional media types—
   a. Audio/Video formats—AVI, DV, AIFF, WAV, MIDI
   b. Graphic formats—JPEG, GIF, PNG, BMP, TIFF, WMF and also AutoCAD (DXF), Adobe Illustrator, Adobe FreeHand, Silicon Graphics IRIS Graphic File (SGI).
7. Ability to apply advanced formatting like changing font style and size for text in transcription, translation, and annotation.
8. Spelling Checker
9. Support for MusicXML based Transcription
10. Support for Music Notation and Dance Notation (Labanotation)
11. Collaboration tools (Instant Messenger, Whiteboard)
12. Software Development Kit
13. Priority Support (Silver/Gold/Diamond level)

Site Account in the Internet ASP model. In accordance with one or more embodiments of the present invention, the ASP model may have all the features of the free account and also be customized by selecting features from the Premium account. The ASP model may provide additional features (within the context of the ASP site for the purchasing organization), including, but not limited to, the following:

1. Multi-Sync
2. Reports—Usage Statistics, List of Registered Users, and request for customized reports
3. Site Administration
4. Site Customization
5. Approve registrations
6. Add/Delete Registered Users Client-Server model. In accordance with one or more embodiments of the present invention, the client-server model is installed at the user's location. This ensures that the user's data is stored on the organization's servers. The clients in this model will, generally, default to storing and working with media, transcription, translation, and synchronization on the organization's server. The feature set available in the Client-Server model will be the same as that available in the ASP model.

In general, the system server application will be a combination of multiple software engines working together to provide the full range of functionalities. The system application is of a generalized nature, with application in various industry types. Therefore, the system may be customized per an organization's specific requirements and provide installation, configuration, maintenance, training and support services for the Client-Server model on a case-by-case basis. Some examples of requirements that may vary across organizations include, but are not limited to:

1. Number/size of media files to be handled
2. Desired response times for auto transcription/translation/synchronization
3. Integration with existing systems
4. Number of simultaneous users to be supported
5. Customization of categories/user groups/permission model/user interface In accordance with one or more embodiments of the present invention, third-party commercial/open-source software may be integrated to provide certain advanced features like auto-transcription, auto-translation, auto-synchronization, search etc. This software may need to be bundled as part of the system installer for distribution in the client-server model.

In general, the Client-Server model must support integration with existing LDAP and Active Directory based authentication mechanism to provide single sign-on features, in addition to the default database authentication mode.

Standalone Model. In accordance with one or more embodiments of the present invention, the system standalone model may be distributed as single user license. The standalone model will essentially provide the same features as the free interne version with the exception that the transcription/translation/annotation/synchronization data will be stored on the local machine instead of on the system servers. The users will be able to perform manual transcription, translation, annotation, and synchronization with a media file on the local machine.

The Standalone system model may provide an additional feature to upload the system work (media file with associated transcription, translation, annotation, and synchronization data) on to the system servers. The users of Standalone system should also be able to export their system work (media file with associated transcription, translation, annotation, and synchronization data) so that it can be shared with other Standalone system users. The system should allow exporting works so that it can be packaged and shared for viewing by other users of the system.

In general, only the "Premium" version for Standalone model is considered at this stage with basic options; other options will be considered pending further market study to decide the feasibility. No free standalone is considered until further market analyses are made. The only free version is the "Lite" browser-based that is considered at this time.

In accordance with one or more embodiments of the present invention, one possible design approach could be to have the publisher and player as part of a single interface. The user will be able to view the features that the publisher offers, although the users will be prompted to register before they can use the publisher features. For e.g. While viewing a system work, the user will be able to see that there is a 'create transcript' option, however if the users click on it they will be prompted to signup before being able to use the same. The publisher features could be enabled based on the user's purchased options and be disabled for users who have not signed in to the system.

In general, the system design must be flexible to accommodate addition of features from the premium model to the free model and vice-versa. Each uploaded media can have only one transcript for each of the following types: Textual transcript, MusicXML transcript, and Labanotation transcript. Each uploaded media can have only one translation in each supported language. Each uploaded media can have only one transliteration (used for representing pronunciation of media's language in each supported language) for each supported language.

Figure 2:
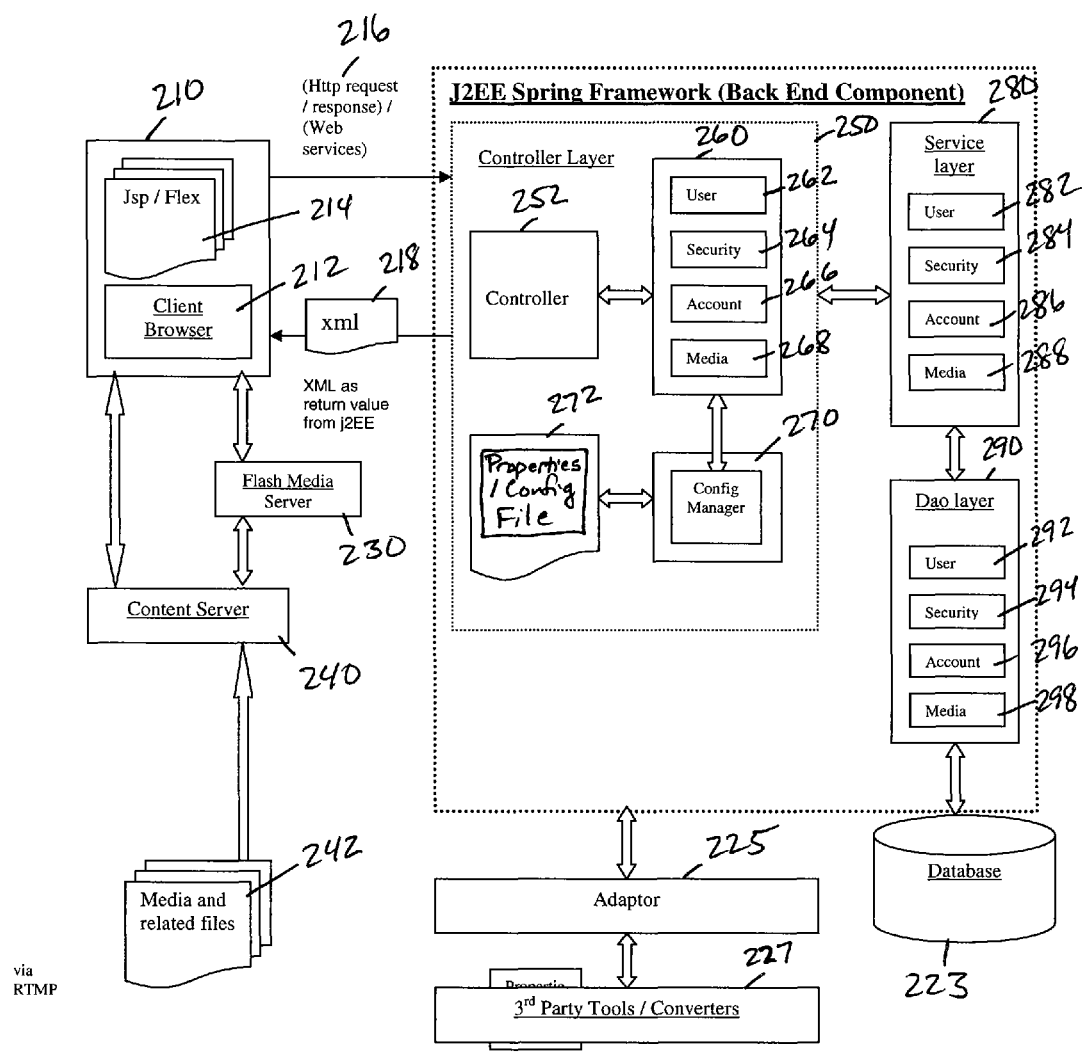
FIG. 2 is a high-level design diagram of a system that creates a real-time collaboration and synchronization of disparate media components, in accordance with an embodiment of the present invention.

FIG. 2 is a high-level design diagram of a system that creates a real-time collaboration and synchronization of disparate media components, in accordance with an embodiment of the present invention. The system of FIG. 2 is designed to use a proven 4-tier architecture with the client tier (web browser), middle tier (application server), data tier (database), and media server (database for media). In FIG. 2, a system 200 may include a client 210, which may include a client browser 212 and a Jsp/Flex system front-end 214, that is connected to a J2EE Spring Framework (back-end component) 220 and client 210 may send Http request(s)/response(s) 216 for web services to and receive XML messages 218 from the framework 220. A flash media server 230 may be connected to the client 210 and the flash media server 230 may also be connected to a content server 240 for the downloading and uploading of flash media content files. The content server 240 may also be directly connected to the client 210 and also connected to multiple other media and related files 242 that may also be downloaded directly to the client 210.

In FIG. 2, the framework 220 may include a controller section 250, which is connected to and communicates with the client 210. The controller section 250 may include a controller 252 that is connected to a controller layer 260, which may be connected to a configuration manager 270 that may be connected to a properties configuration file 272. The controller section may in turn be connected to a service layer 280, which may be connected to a data access object (Dao) layer 290. The Dao layer 290 is connected to a database 223. The framework 220 may be connected to an adaptor 225, which in turn may be connected to third-party tools and/or converters 227.

The system application 200 of FIG. 2 is designed to leverage benefits of MVC (Model view controller) pattern. The application is divided into the various components to make it modular. Each component has a controller to control the user requests, the service layer 280 also known as a business layer to handle business logic and Flash client to display the view. All the requests from the client (browser) 210 are controlled and monitored by the controller 252. The client 210 will communicate with server using Http request/response or Web services 216. The controller 252 will use the security component 264 to authorize and authenticate the user. After the user is authenticated, the controller 252 will analyze the request and invoke the appropriate component to service the request. The components will use media server to stream media to the client application. Each component has a service layer 280 that will facilitate the request of the user and as per the requirement will either query or persist the data using the DAO (Data Access Object) to the database layer 290. The DAO layer 290 allows the service layer 280 to function independent of the persistence mechanism. The data between the layers is passed using DTO (Data Transfer objects) pattern.

In FIG. 2, the components are coupled through an IOC (Inversion of Control) pattern built-in spring framework 220. The spring framework 220 due to its IOC technology loosely couples the components and also facilitates the ORM tools used for Data persistence with the help of DAO layer 290 on ORM. It also helps in easy configuration of DataSource and also has a very good Transaction management system in place.

In FIG. 2, the application uses, for example, but not limited to, Spring Framework 220 with Hibernate (ORM tool) for backend business logic. The Spring Framework is a robust, flexible, and well-designed framework for rapidly developing web applications. Spring enables developers to build applications using POJOs (Plain Old Java Objects), and provides a mechanism for creating loosely coupled application using Inversion of Control and Dependency Injection. Spring's data access architecture allows it to integrate with any underlying data access technology. Spring and Hibernate are a popular combination.

Hibernate is an open source OR mapping framework. Hibernate enables us to develop persistence classes with support for association, inheritance, polymorphism, composition, and the Java collections framework. Hibernate uses XML (*.hbm.xml) files to map Java classes to tables and JavaBeans properties to database tables. The above diagram also highlights the communication of the system 200 with third party tools/converters for various purposes like converting media files to Flash player compatible, Auto-Transcript, Auto-Synchronization, Auto-Translation, etc. For example, the system will forward the request along with the media to an adaptor 225 which in turn will queue the request and will divert the request to a requested 3rd party tool/converter 227 and at the end of conversion transfer back the media or media with related document back to the system, which in turn gets persisted and media files uploaded in the content server as per predefined folder structure.

Figure 3A:
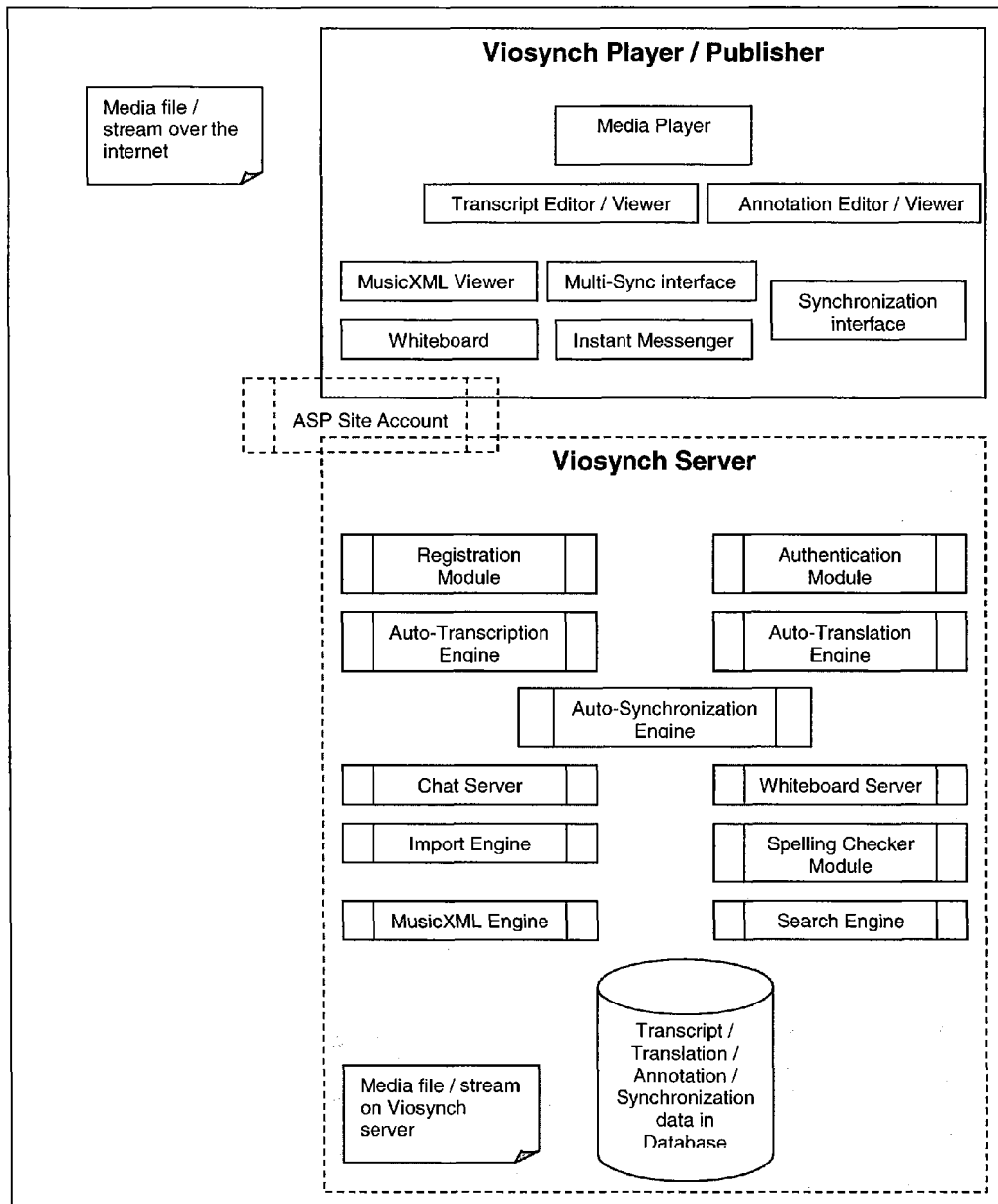
FIG. 3A is a detailed functional block diagram of a system and its major components that creates a real-time collaboration and synchronization of disparate media components, in accordance with an embodiment of the present invention.

FIG. 3A is a detailed functional block diagram of a system and its major components that creates a real-time collaboration and synchronization of disparate media components, in accordance with an embodiment of the present invention. In FIG. 3A, a block diagram 300 of a system player/publisher 310 and a system server 320 and various components in each are identified. These components may include, but are not limited to, the following.

A registration module 321 to provide the registration functionalities for the various delivery models—Internet, ASP, Client-Server, and Standalone.

An authentication module 322 to provide the authentication and authorization features for registered users for the Internet and ASP delivery models.

An auto-transcription engine 323 to comprise of speech recognition engines for various supported languages. This engine 323 will be used by the system to create auto-transcription for input media files. The system server will allow access to this component after appropriate authentication and authorization.

An auto-translation engine 324 to comprise of language packs for translating between various supported languages. This engine 324 will be used by the system to create auto-translation for input transcript/translation files. The system server will allow access to this component after appropriate authentication and authorization.

An auto-synchronization engine 325 to allow users to automate the synchronization of selected transcript file to the associated media. This engine may employ phonetic search to synchronize the transcript chunks with respective time code in the media file.

A chat server 326 to allow the IM component in the client to collaborate with other users about the media they are currently playing using chat along with synchronized media.

A whiteboard server 327 to allow the Whiteboard component in the client to collaborate with other users about the media they are currently playing using white-boarding tools like line drawing, curve drawing, text entry.

An import engine 328 to provide the functionality to import system work, created using an earlier system Publisher version 1.0, to be imported into the new system.

A Spelling Checker Module 329 to provide the spell check functionality in various languages to the transcript, translation and annotation editors.

A MusicXML Engine 330 to be responsible for parsing and validating the MusicXML files provided by the users as transcript.

A Search Engine 331 to provide the search functionalities for the system. The search engine to constantly update its index to incorporate new media, transcript, translation, and annotation that is added.

A Database 335 to provide the primary storage for transcript, translation, annotation, and Synchronization data.

A Media File 336 to be stored on a streaming server to improve user experience.

There are also various client components identified to provide the system player/publisher features include the following.

A Media Player 311 to provide the features to view and navigate within the various supported media types to the user. This player 311 is the primary component driving the synchronization of other related assets.

A Transcript Editor/Viewer 312 to allow the user to create, import, modify, and format the transcript or translation for respective media files.

An annotation Editor/Viewer 313 to allow the user to create, modify, and format the annotation for respective media files. Users will be able to reply to annotations thus forming an annotation thread for any given point in the media.

A MusicXML Viewer 314 to be responsible for displaying the MusicXML transcript entered by the user as musical notes.

A Multi-Sync Interface 315 to be an easy-to-use intuitive interface for users who wish to multi-sync between multiple media files.

A Synchronization Interface 316 to be an easy-to-use intuitive interface for users who wish to manually synchronize certain media with associated assets.

An Instant Messenger 317 to allow users to collaborate about the media they are currently playing in their Synchrotext media player, using chat along with synchronized media.

A Whiteboard 318 to allow users to collaborate about the media they are currently playing in their Synchrotext media players using white-boarding tools like line drawing, curve drawing, text entry.

Figure 3B:
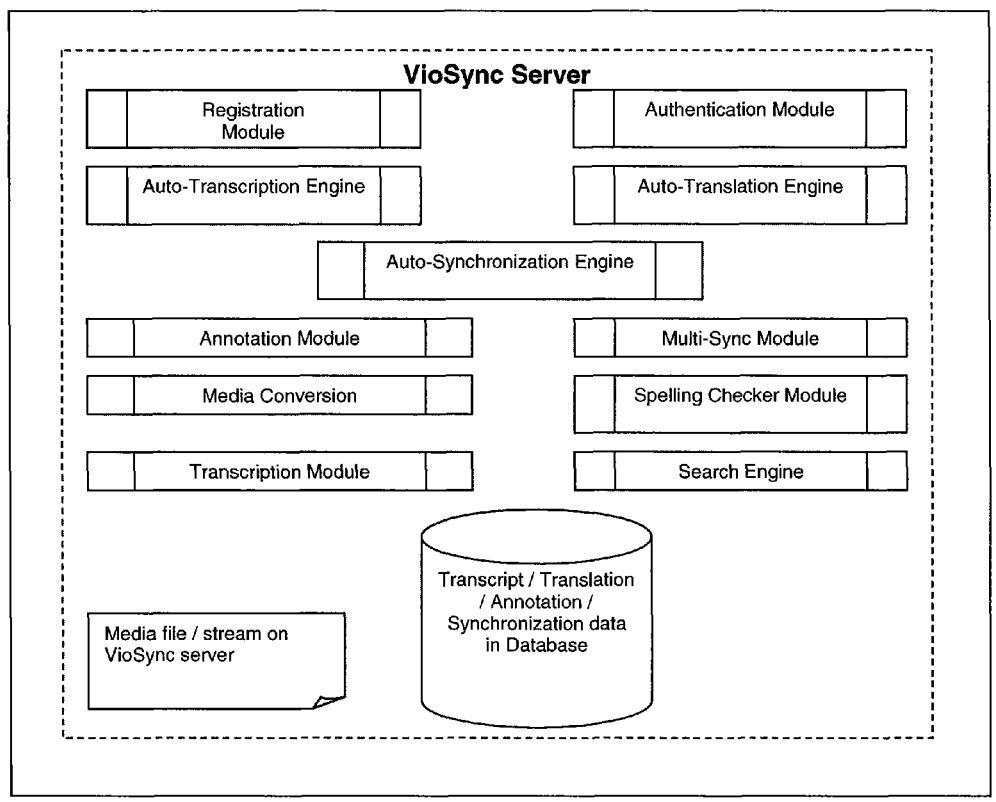
FIG. 3B is a detailed functional block diagram of a system and its major components that creates a real-time collaboration and synchronization of disparate media components, in accordance with another embodiment of the present invention.

FIG. 3B is a detailed functional block diagram of a system and its major components that creates a real-time collaboration and synchronization of disparate media components, in accordance with another embodiment of the present invention. In FIG. 3B, a block diagram 300 of a system server 320' and various components in each are identified. These components may include, but are not limited to, the following.

A registration module 321' to provide the registration functionalities for the various delivery models—Internet, ASP, Client-Server, and Standalone.

An authentication module 322' to provide the authentication and authorization features for registered users for the Internet and ASP delivery models.

An auto-transcription engine 323' will comprise of speech recognition engines for various supported languages. This engine 323' will be used by the system to create auto-transcription for input media files. The system server will allow access to this component after appropriate authentication and authorization.

An auto-translation engine 324' will comprise of language packs for translating between various supported languages. This engine 324' will be used by the system to create auto-translation for input transcript/translation files. The system server will allow access to this component after appropriate authentication and authorization.

An auto-synchronization engine 325' will allow users to automate the synchronization of selected transcript file to the associated media. This engine may employ phonetic search to synchronize the transcript chunks with respective time code in the media file.

A annotation module 326' to allow the IM component in the client to annotate the media they are currently playing along with synchronized media.

A multi-sync module 327' to enable the client to synchronize multiple media files.

A media conversion module 328' to provide the functionality to convert media files to be imported into the new system.

A Spelling Checker Module 329' to provide the spell check functionality in various languages to the transcript, translation and annotation editors.

A transcription module 330' to enable transcription of text for synchronization with a media file.

A Search Engine 331' to provide the search functionalities for the system. The search engine to constantly update its index to incorporate new media, transcript, translation, and annotation that is added.

A Database 335' to provide the primary storage for transcript, translation, annotation, and Synchronization data.

A Media File 336' to be stored on a streaming server to improve user experience.

Figure 4:
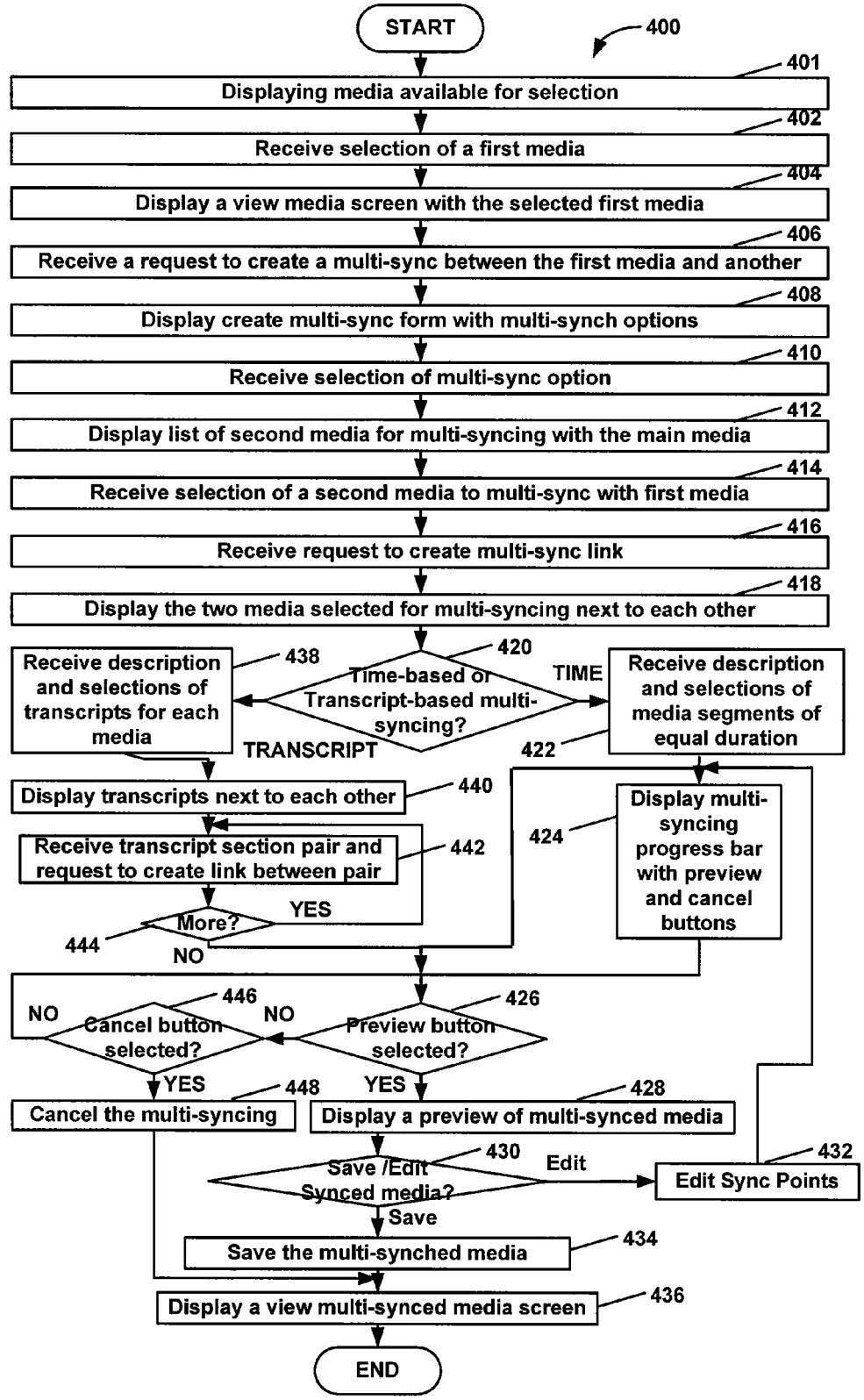
FIG. 4 is a flow chart of a method of operation of a system that creates a real-time collaboration and synchronization of disparate media components, in accordance with an embodiment of the present invention.

FIG. 4 is a flow chart of a method of operation of a system that creates a real-time collaboration and synchronization of disparate media components, in accordance with an embodiment of the present invention. In FIG. 4, a method 400 may display (401) a listing of media that are available for selection for multi-syncing, receive (402) a selection of a first media from a user and then display (404) a view media screen specific to the user selection of the first media. The method 400 may then receive (406) a request from the user to create a multi-sync between the first media and another media, display (408) a create multi-sync form with several multi-sync options, for example, but not limited to, a time-based multi-sync, and a transcript-based multi-sync. The method 400 may then receive (410) a selection of one of the displayed multi-sync options, display (412) a list of at least one second media for multi-syncing with the first media, receive (414) a user selection of a second media to multi-sync with the first media, receive (416) a request to create a multi-sync link between the first and second media, and display (418) the two media that have been chosen for multi-syncing. The method 400 may then determine (420) whether the multi-sync option was to create a link using time-based or transcript-based multi-syncing. If time-based, the system receives (422) from the user a description of the media and selections of media segments from each media with equal time durations, and displays (424) a multi-syncing progress bar with preview and cancel buttons while the multi-syncing of the first and second media is in progress. If the preview button is selected (426), the method 400 will display (428) a preview of the multi-synced media. If a user request to edit the media is received (430), the system enables the user to edit (432) the sync points in the multi-synced media to change them or add additional sync points. How the editing (432) of the sync points is done depends on whether time-based or transcript-based multi-syncing was selected. The method 400 then loops back to display (424) and continues from there. If a user request to save the media is received (430), the system saves (434) the multi-synced media, and displays (436) the view multi-synced media screen. The method 400 at this point is finished, but may be restarted by returning to displaying (401) or stopped by ending the processing.

Alternatively, in FIG. 4, if the preview button is NOT selected (426), and the cancel button is selected (446), the method 400 will cancel (448) the multi-syncing of the media, and displays (436) the view multi-synced media screen. The method 400 at this point is finished, but may be restarted by returning to displaying (401) or stopped by ending the processing.

In FIG. 4, if the multi-syncing is to be transcript-based, the system receives (438) from the user a description of the media and selections of media segments from each media with equal time durations, and displays (440) the selected transcripts next to each other below the first and second media. The method then receives a transcript section pair and requests (442) the creation of a link between the pair. This continues until no more transcript section pairs are received and the method 400 may display (424) the multi-syncing progress bar and continue as described above.

Figure 5:
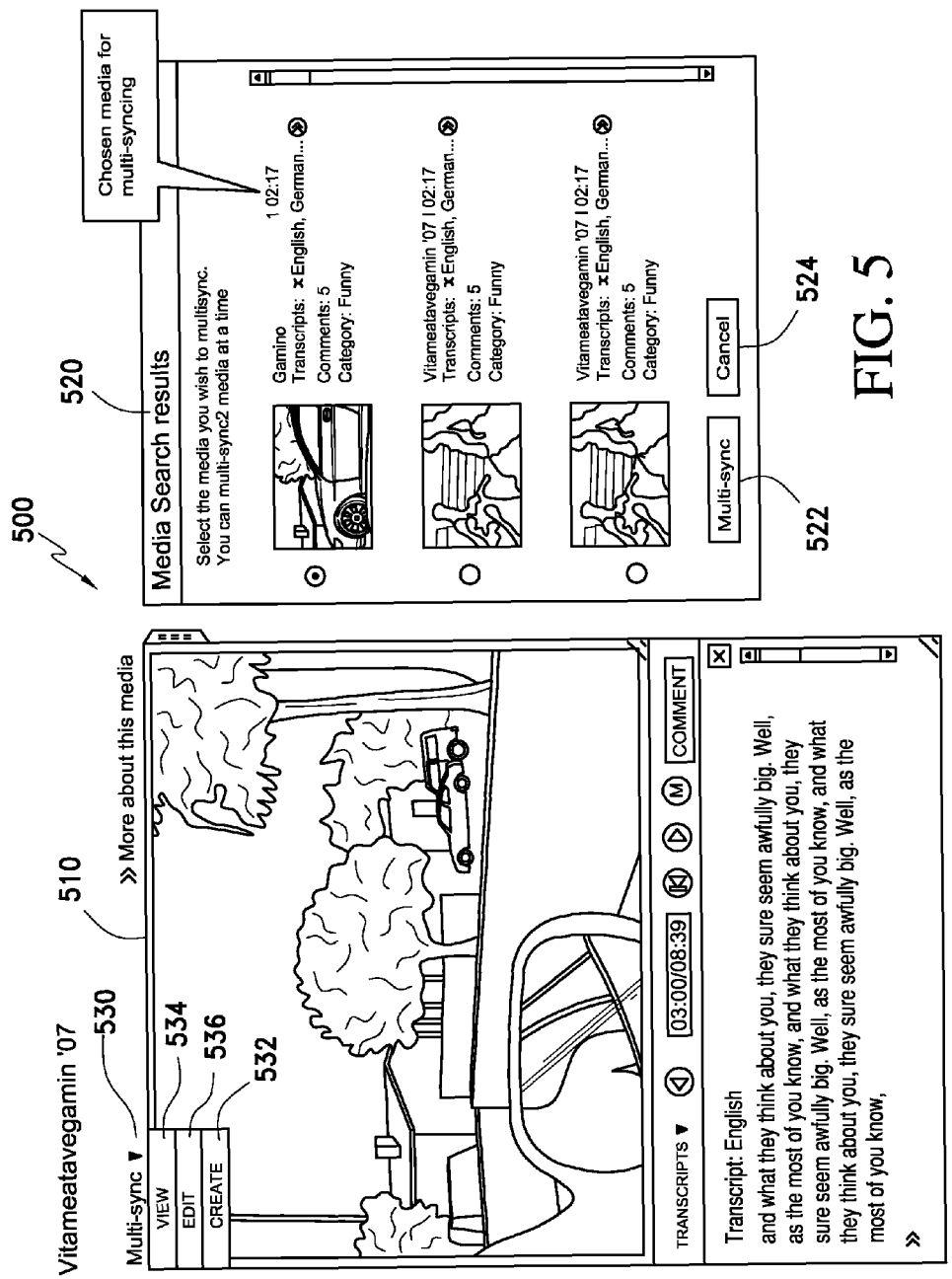
FIG. 5 is a screen shot of a view media screen with a left window displaying a selected main media type file and a right window displaying several second media type files available for multi-syncing with the selected main media type file, in accordance with an embodiment of the present invention.

FIG. 5 is a screen shot of a view media screen 500 with a left window 510 displaying a selected first media file and a right window 520 displaying several second media files available for multi-syncing with the selected first media type file, in accordance with an embodiment of the present invention. As seen in FIG. 5, Multi-sync is available for any video media accessed by a user. Once the user selects a media from the homepage, s/he is taken to the view media screen. A create link 532 in the multi-sync dropdown 530 enables the user to multi-synch 2 media at a time. The user can also view 534 and edit 536 multi-sync media from the list of created earlier. To create multi-sync between the displayed media and another media, the user selects the create 532 functionality in the multi-sync dropdown. S/he then searches the right window 520 for the media s/he wishes to multi-sync the first media with by entering the media title/tag or category. S/he then selects a media from the media search results list and clicks on the multisync button 522.

Figure 6:
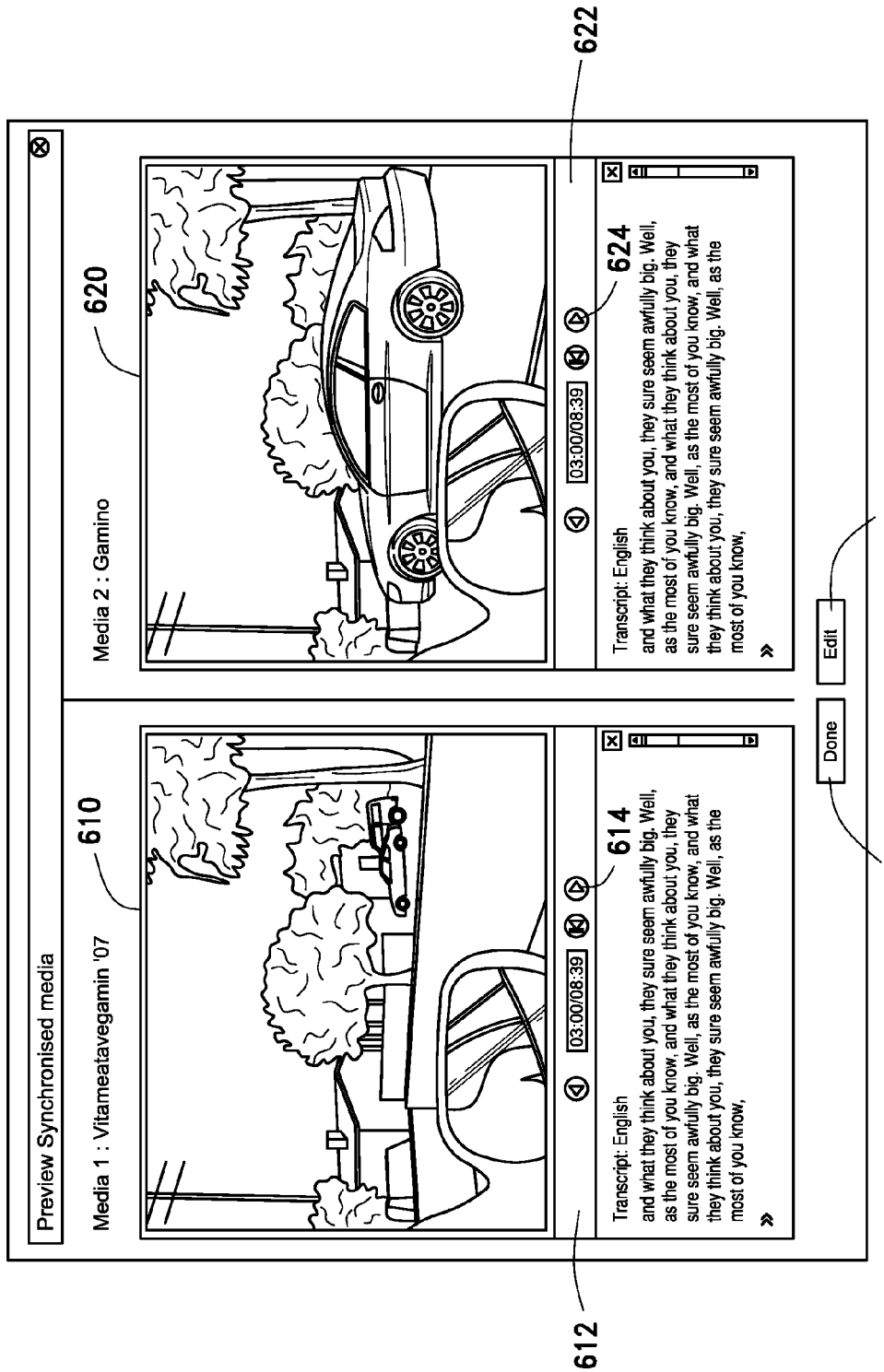
FIG. 6 is a screen shot of a preview synchronized media screen, generated using time-based syncing, with a left window displaying the selected main media type file from FIG. 5 and a right window displaying a selected second media type file, also from FIG. 5, in accordance with an embodiment of the present invention.

FIG. 6 is a screen shot of a preview synchronized media screen 600, generated using time-based syncing, with a left window 610 displaying the selected first media file from FIG. 5 and a right window 620 displaying a selected second media file, also from FIG. 5, in accordance with an embodiment of the present invention. In FIG. 6, the user receives an alert message confirming the 2 media have been chosen for multi-syncing. Based on the selection, the system also does a check whether the time duration for both are equal. If both the media are of equal duration, time based synching is selected by default. Time based synching is done automatically via the application and does not need manual user intervention. The user has a choice of Transcript based synching and Time based synching. If the user selects time-based synching, the multi-synching process gets initiated and the user can cancel it if desired. Clicking on Preview will take the user to a preview screen displaying both the multi-synched media. Clicking on Cancel will cancel multi-sync and take the user back to view media screen. The user can preview the two medias in the preview screen with their respective transcripts. This screen will be a pop-up, and will display both the medias with their respective controller bars 612, 622 (play 614, 624/ pause, etc). On clicking play 614, 624 of one media, the videos of both media will start playing simultaneously whereby the audio of one media is active and the mute in the other media. Clicking play 614, 624 in one will also de-activate the media controls of the other media. The time bar will show the user the synchronization between the media at the same frame/time. The user can thus compare the synchronization of both the media and click on a done or edit button 618 on top to close this pop-up and return to the view media screen. To edit the multi-synch points, the user clicks on the Pause button and then clicks on the edit button 618, which displays the hierarchy based multi-sync screen.

Figure 7:
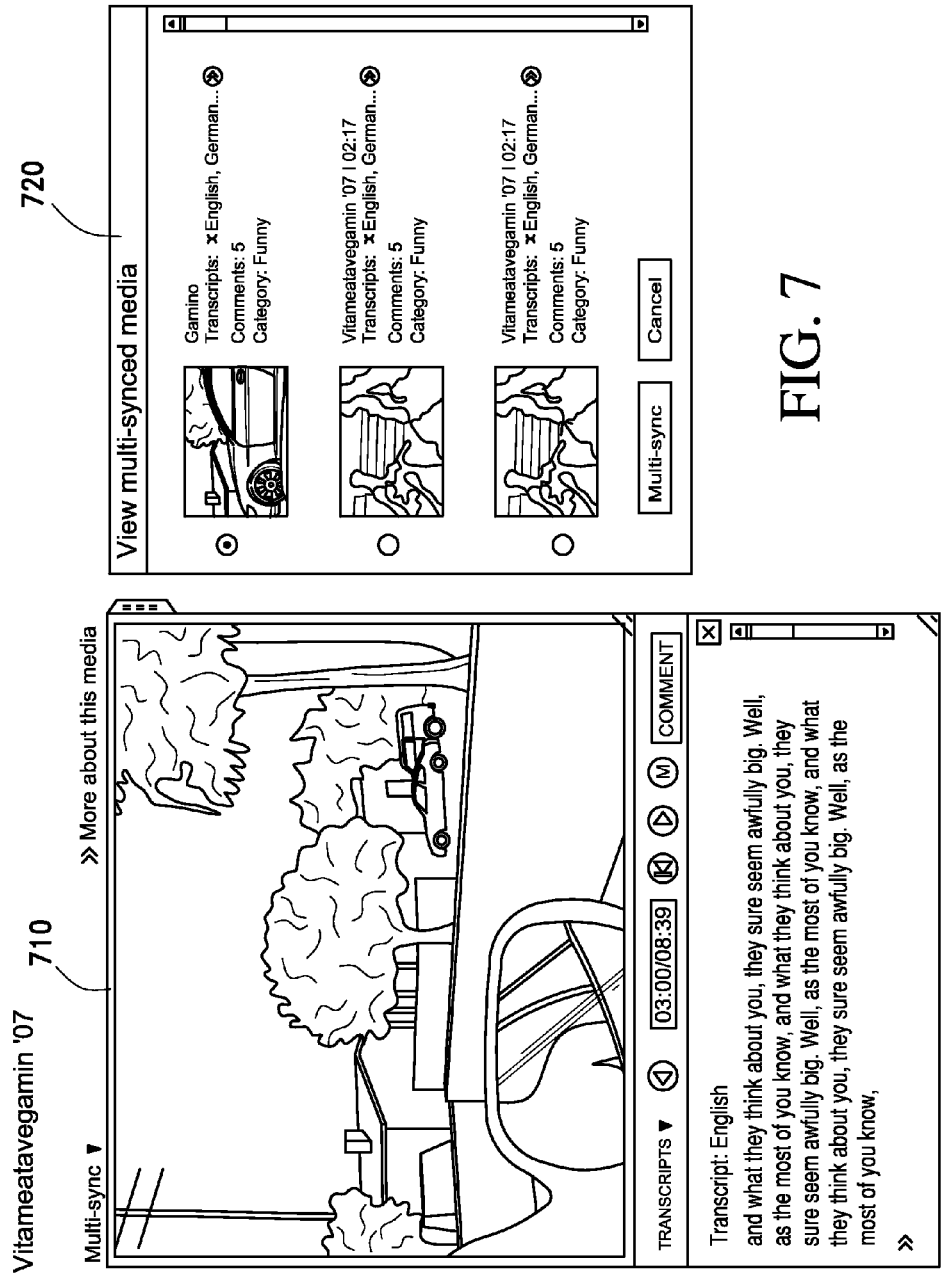
FIG. 7 is a screen shot of a view multi-synced media screen, after exiting the preview synchronized media screen of FIG. 6 and the multi-synced media generated using time-based syncing in FIG. 6 has been saved, with a left window displaying the selected main media type file from FIG. 5 and a right window displaying a selected second media type file, also from FIG. 5, in accordance with an embodiment of the present invention.

FIG. 7 is a screen shot of a view multi-synced media screen, after exiting the preview synchronized media screen of FIG. 6 and the multi-synced media generated using time-based syncing in FIG. 6 has been saved, with a left window 710 displaying the selected main media type file from FIG. 5 and a right window 720 displaying a selected second media type file, also from FIG. 5, in accordance with an embodiment of the present invention. Once the user has clicked on the done button 618, the preview screen will close and the view media screen will refresh with the multi-synched media panel open next to the main media. Clicking on a thumbnail in this panel will allow the user to toggle to the multi-synched media created or she can also preview both the media in the preview mode.

Figure 8:
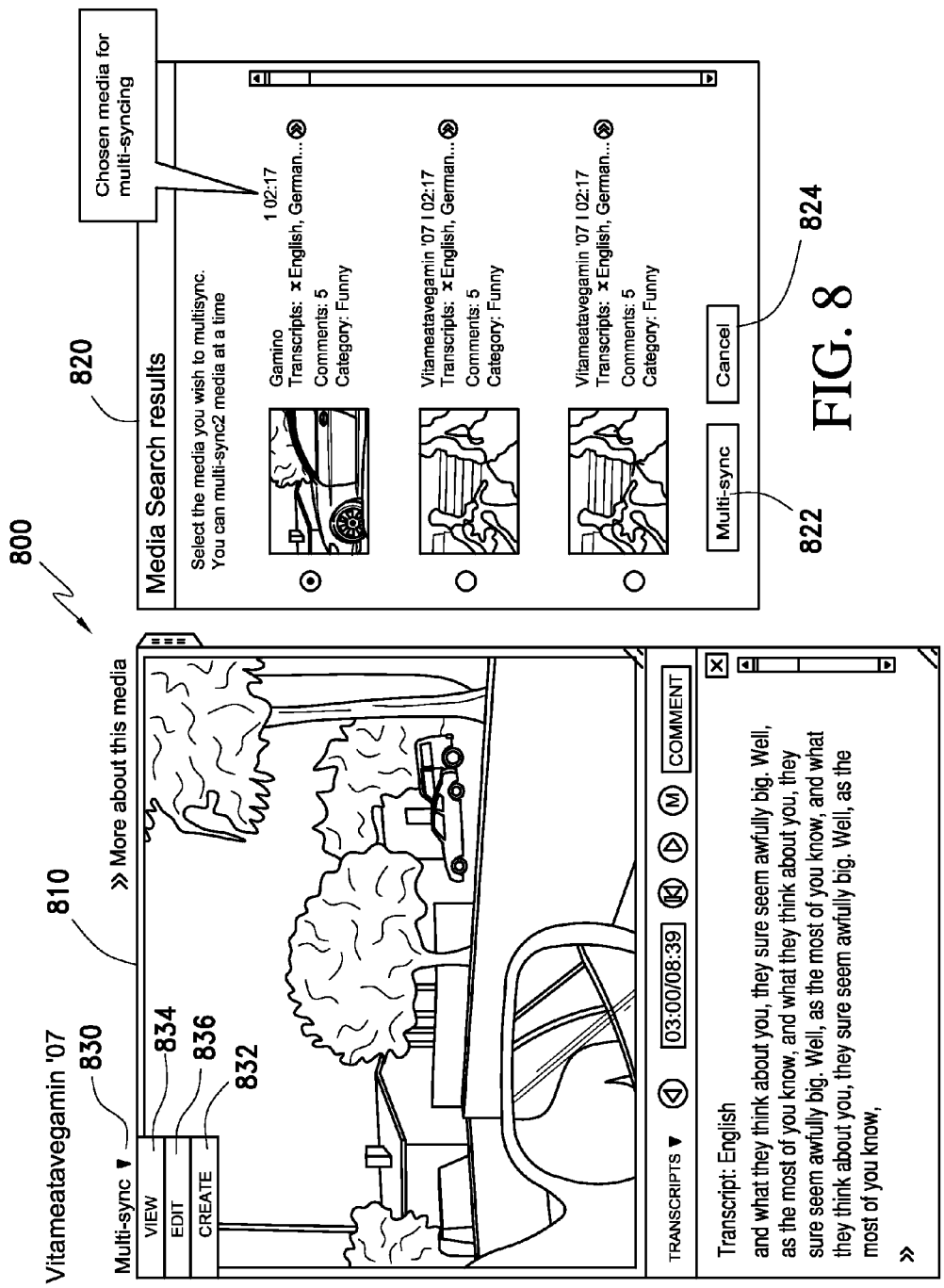
FIG. 8 is a screen shot of a view media screen with a left window displaying a selected main media type file and a right window displaying several second media type files available for multi-syncing with the selected main media type file as in FIG. 5, in accordance with an embodiment of the present invention.

FIG. 8 is a screen shot of a view media screen 800 with a left window 810 displaying a selected main media type file and a right window 820 displaying several second media type files available for multi-syncing with the selected first media file as in FIG. 5, in accordance with an embodiment of the present invention. In FIG. 8, multi-sync is available for any video media accessed by a user. Once the user selects a media from the homepage, the user is taken to the view media screen 800. The create link 832 in the multi-sync dropdown enables the user to multi-synch 2 media at a time. The user can also view and edit multi-sync media from the list of created earlier media.

To create a multi-sync between the displayed media and another media, the user selects the create 832 functionality in the multi-sync dropdown 830. The user then searches for the media the user wishes to multi-sync the first media with by entering the media title/tag or category. The user then selects a media from the media search results list and clicks on the multisync button 822. The user receives an alert message confirming the 2 media have been chosen for multi-syncing. Based on the selection, the system may do a check whether the time duration for both are equal or ask which type of multi-syncing is to be performed, time-based or transcript-based. If both the media are of equal duration, time based synching is selected by default. Time based synching is done automatically via the application and does not need manual user intervention. The user has a choice of Transcript based synching and Time based synching. S/he selects Transcript based synching and clicks on the continue button.

Figure 9:
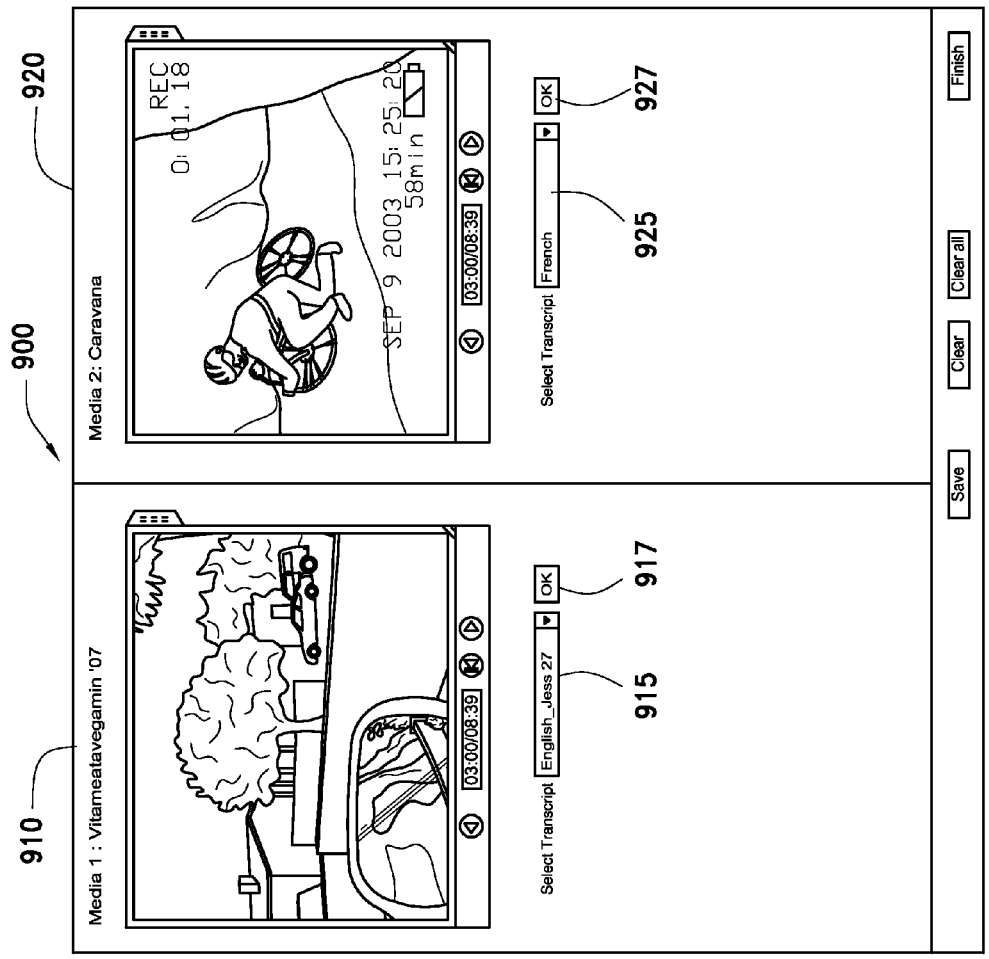
FIG. 9 is a screen shot of a multi-sync screen that appears after a user selects to use transcript-based syncing, with a left window displaying the selected main media type file from FIG. 8 and a right window displaying a selected second media type file, also from FIG. 8, in accordance with another embodiment of the present invention.

FIG. 9 is a screen shot of a multi-sync screen 900 that appears after a user selects to use transcript-based syncing, with a left window 910 displaying the selected first media file from FIG. 8 and a right window 920 displaying a selected second media file, also from FIG. 8, in accordance with another embodiment of the present invention. In FIG. 9, the user can preview the two selected media in the multi-sync screen 900. The user is asked to select a transcript for each media from a drop-down menu 915, 925, respectively, in each window.

Figure 10:
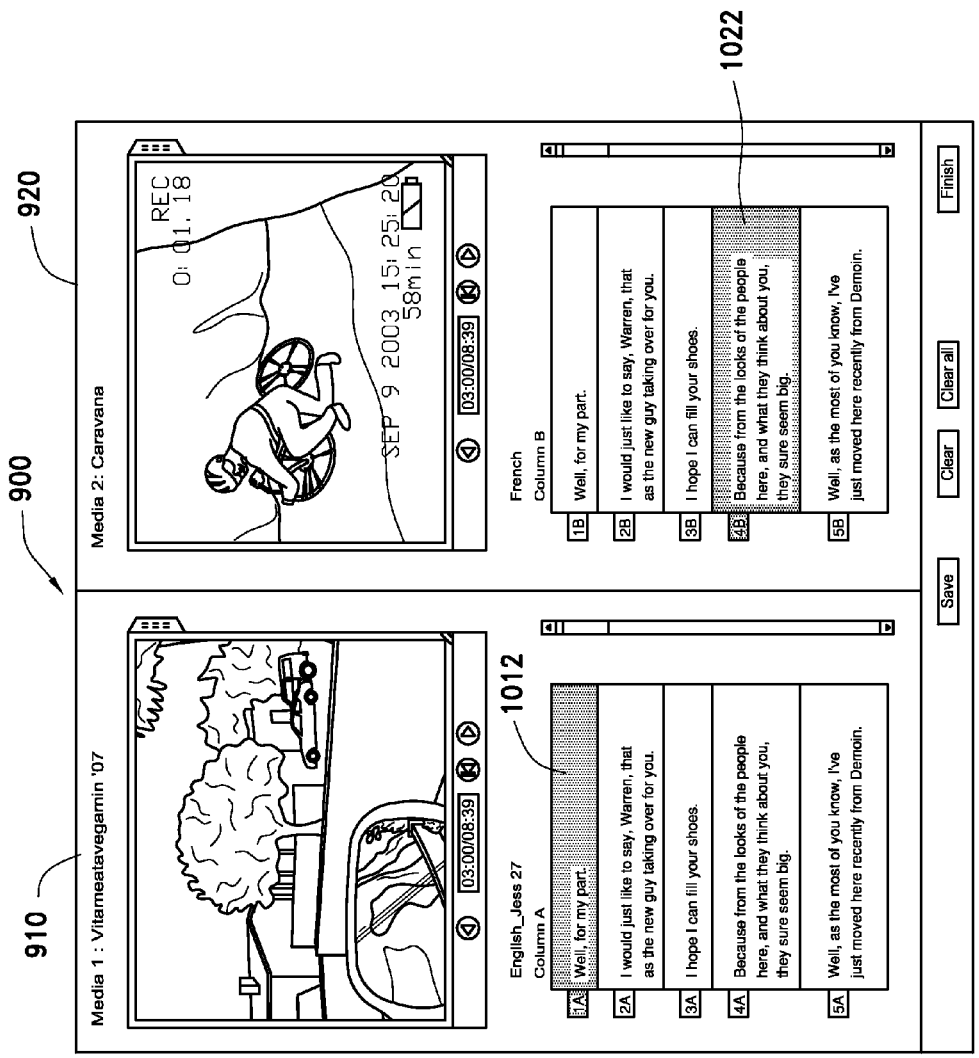
FIG. 10 is a screen shot of the multi-sync screen from FIG. 9 with selected transcripts in each window that appears after the user selects a transcript from the pull down menus in each window, in accordance with an embodiment of the present invention.

FIG. 10 is a screen shot of the multi-sync screen 900 from FIG. 9 with selected transcripts in each window that appear after the user selects a transcript from the pull down menus 915, 925 in each window, in accordance with an embodiment of the present invention. In FIG. 10, the transcripts of each media are displayed after the user selects a transcript for each and clicks an 'OK' button 917, 927 in FIG. 9. In FIG. 10, the transcripts are shown as Column A for the first media and Column B for the second media. Each chunk/row of the transcript is numbered according to the columns. The user has to click one chunk/row from column A (e.g., 1A 1012 of Column A) and then click a chunk/row from column B (e.g., 4B 1022 of Column B) to create the multi-sync points.

Figure 11:
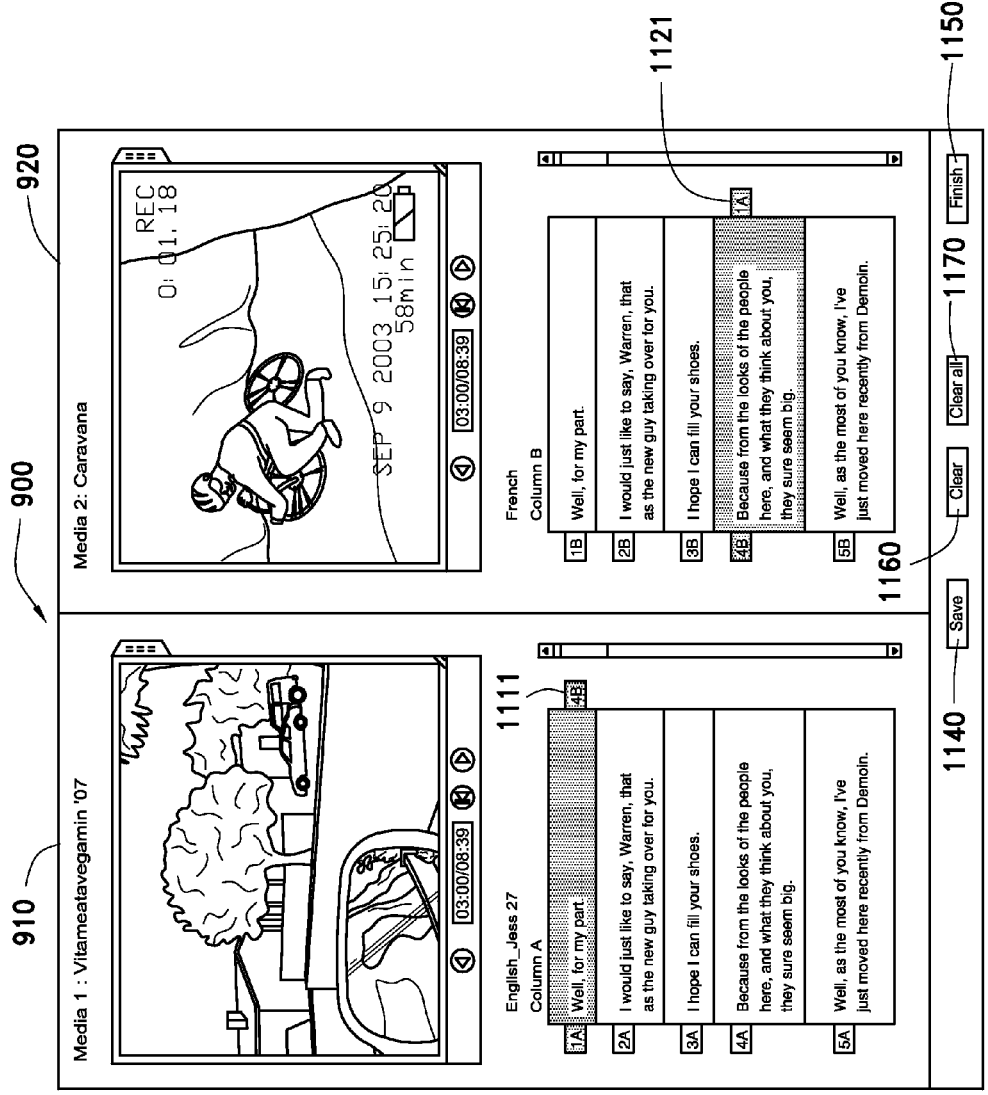
FIG. 11 is a screen shot of changes to the multi-sync screen from FIG. 10 that appear after the user selects points in each transcript from Column A and Column B to be multi-synced together, in accordance with an embodiment of the present invention.

FIG. 11 is a screen shot of changes to the multi-sync screen from FIG. 10 that appear after the user selects points in each transcript from Column A and Column B to be multi-synced together, in accordance with an embodiment of the present invention. In FIG. 11, once the user clicks the second column, the linked row numbers appear. For example, if 1A is linked to 4B, then the label '4B' 1111 appears next to the 1A row and the label '1A' 1121 appears next to the row '4B' as shown. The user can click this linked row label to access it. For example, if the user clicks '4B' next to the row 1A, then the row '4B' will be shown in a selected state. In case the row '4B' is at the bottom of Column B, it will scroll up and appear to the user.

In FIG. 11, users can click 'Save' 1140 to save their work and then click the 'Finish' button 1150 when they are done. The 'Clear' button 1160 can be clicked to undo one level. 'Clear all' button 1170 will remove all unsaved selections made by the user.

Figure 12:
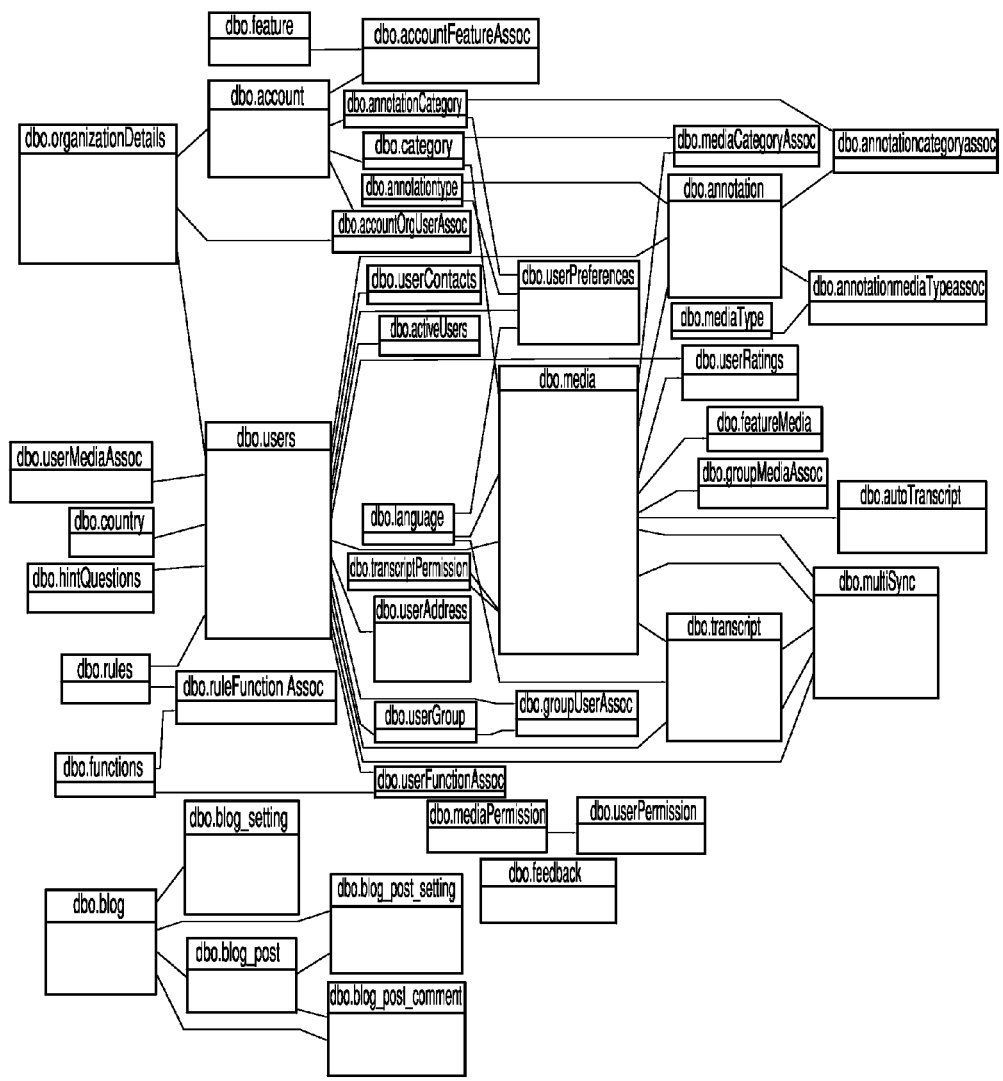
FIG. 12 is data model diagram of a system that creates a real-time collaboration and synchronization of disparate media components, in accordance with an embodiment of the present invention.

FIG. 12 is a data model diagram of a system that creates a real-time collaboration and synchronization of disparate media components, in accordance with an embodiment of the present invention. In FIG. 12, the interrelationship of the Tables is shown and the following provide an overview of the tables.

Access table, Table 1, stores the access permissions, and may include the following access attributes described therein.

TABLE 1

| Attribute | Type | Notes |
| --- | --- | --- |
| accessId | VARCHAR2 (50) | This is the primary key. Primary Key; Not Null; |
| permissionName | VARCHAR2 (50) | The access names Not Null; |

Account table, Table 2, holds the account details of the organization, and may include the following account attributes described therein

TABLE 2

| Attribute | Type | Notes |
| --- | --- | --- |
| accountId | VARCHAR2 (50) | This is the primary key. Primary Key; Not Null; |
| organizationId | VARCHAR2 (50) | This is the foreign key. Not Null; |
| startDate | DATE | This column stores the start date of the account Not Null; |
| endDate | DATE | This column stores the end date of the account. Not Null; |
| numberOfAccounts | NUMBER (8) | This column stores number of accounts purchased by organization. Not Null; |
| numberOfAccounts consumed | NUMBER (8) | This columns gives the # of accounts used. |

AccountOrgUserAssoc table, Table 3, holds the relation of User with Org and Account Type the user is associated with, and may include the following accountOrgUserAssoc attributes described therein.

TABLE 3

| Attribute | Type | Notes |
| --- | --- | --- |
| accountId | VARCHAR2 (50) | This is the composite key Primary Key; Not Null; |
| orgId | VARCHAR2 (50) | This is the composite key. Primary Key; Not Null; |
| userId | VARCHAR2 (50) | This is the foreign key Not Null; |

Annotation table, Table 4, stores the comments of the users on the media, and may include the following account attributes described therein.

TABLE 4

| Attribute | Type | Notes |
| --- | --- | --- |
| annotationId | VARCHAR2 (50) | This is the primary key. Primary Key; Not Null; |
| label | VARCHAR2 (50) | This is the display name of annotation. |
| content | VARCHAR2 (1000) | This is the comment for the media by viewer. |
| userId | VARCHAR2 (50) | This is the foreign key. Not Null; |
| annomediaTypeId | VARCHAR2 (50) | This is the foreign key. This gives the type of Annotation. Not Null; |
| dateTime | DATE | This stores the date and time of annotation Not Null; |
| ParentAnnotationId | VARCHAR2 (50) | This gives the parent annotation id. i.e.; on which annotation this annotation is done. Not Null; |

TABLE 4-continued

| Attribute | Type | Notes |
| --- | --- | --- |
| mediaId | VARCHAR2 (50) | This is the foreign key. Not Null; |
| isAuthorized | VARCHAR2 (1) | This column stores the flag for the authorization of the media. Default is 'N'. Not Null; Initial Value: 'N'; |

AnnotationMediatypeassoc table, Table 5, holds the relation of User with Org and Account Type the user is associated with, and may include the following annotationMediatypeassoc attributes described therein.

TABLE 5

| Attribute | Type | Notes |
| --- | --- | --- |
| annotationId | VARCHAR2 (50) | This is the composite primary key. Primary Key; Not Null; |
| mediaTypeId | VARCHAR2 (50) | This is the composite primary key. Primary Key; Not Null; |

Category table, Table 6, holds the category defined for the media, and may include the following category attributes described therein.

TABLE 6

| Attribute | Type | Notes |
| --- | --- | --- |
| categoryId | VARCHAR2 (50) | This is the primary key for the table. Primary Key; Not Null; |
| categoryName | VARCHAR2 (50) | Not Null; |

Favorites table, Table 7, stores the information for the media added by user to his favorites, and may include the following favorites attributes described therein.

TABLE 7

| Attribute | Type | Notes |
| --- | --- | --- |
| userId | VARCHAR2 (50) | This is the composite primary key. Primary Key; Not Null; |
| mediaId | VARCHAR2 (50) | This is the composite primary key. Primary Key; Not Null; |

Functions table, Table 8, holds the Premium Features List, and may include the following functions attributes described therein.

TABLE 8

| Attribute | Type | Notes |
| --- | --- | --- |
| functionId | VARCHAR2 (50) | Primary Key Primary Key; Not Null; |
| functionName | VARCHAR2 (100) | Name of the Premium feature. Not Null; Unique; |
| Handler | VARCHAR2 (200) | Which Controller will handle the request? Not Null; |

Group table, Table 9, stores the group or playlist details created by a user, and may include the following group attributes described therein.

TABLE 9

| Attribute | Type | Notes |
| --- | --- | --- |
| groupId | VARCHAR2 (50) | This is the primary key. Primary Key; Not Null; |
| groupName | VARCHAR2 (50) | This column holds the name of the group. Not Null; |
| ownerId | VARCHAR2 (50) | This is the userId of the creator. Not Null; |
| discriminator | VARCHAR2 (50) | This column discriminates between group and playlist. Not Null; |

GroupMediaAssoc table, Table 10, holds the group created by a user for a media, and may include the following groupMediaAssoc attributes described therein.

TABLE 10

| Attribute | Type | Notes |
| --- | --- | --- |
| groupId | VARCHAR2 (50) | This is the composite primary key. Primary Key; Not Null; |
| mediaId | VARCHAR2 (50) | This is the composite primary key. Primary Key; Not Null; |

GroupUserAssoc table, Table 11, holds the group created by a user for the user, and may include the following groupUserAssoc attributes described therein.

TABLE 11

| Attribute | Type | Notes |
| --- | --- | --- |
| groupId | VARCHAR2 (50) | This is the primary key of group table. Not Null; |
| memberId | VARCHAR2 (50) | This is the userId of the members of the group. Not Null; |

Media table, Table 12, stores the details of the media, and may include the following media attributes described therein.

TABLE 12

| Attribute | Type | Notes |
| --- | --- | --- |
| mediaId | VARCHAR2 (50) | Primary Key; Not Null; |
| mediaTitle | VARCHAR2 (100) | Not Null; |
| languageId | VARCHAR2 (50) | This will store the language of the media. Not Null; |
| duration | VARCHAR2 (50) | This will store the duration of the media. |
| path | VARCHAR2 (250) | This column stores the media path on the content server. |
| mediaOwnerId | VARCHAR2 (50) | This links to the user who uploads the media. Not Null; |
| size | NUMBER (16) | This stores the media size in MB. Not Null; |
| uploadDate | DATE | This column stores the media upload date. Not Null; |
| accessId | VARCHAR2 (50) | This column defines the accessibility of the media. Not Null; |
| isAnnotated | VARCHAR2 (1) | This columns stores whether media is annotated or not Default is 'N'. Not Null; |
| mediaType | VARCHAR2 (50) | Not Null; |
| thumbnailPath | VARCHAR2 (200) | This will store the path of thumbnail for the media. |
| mediaDescription | VARCHAR2 (1000) | This column gives the media Description entered by owner. |
| tags | VARCHAR2 (500) | These are the tags for the media by the owner |
| ratingsNumber | NUMBER (8) | This will store the number of users who have actually rated the media. |

TABLE 12-continued

| Attribute | Type | Notes |
| --- | --- | --- |
| ratingScores | NUMBER (8) | This will be the sum of scores given by users rating the media. |
| hitsontheMedia | NUMBER (8) | This column stores the hits to the media by users. |

MediaCategoryAssoc table, Table 13, holds the relation of category to Media, and may include the following mediaCategoryAssoc attributes described therein.

TABLE 13

| Attribute | Type | Notes |
| --- | --- | --- |
| mediaId | VARCHAR2 (50) | This is the composite key. Primary Key; Not Null; |
| categoryId | VARCHAR2 (50) | This is the composite key. Primary Key; Not Null; |

MediaType table, Table 14, holds the media type used for Annotation, and may include the following mediaType attributes described therein.

TABLE 14

| Attribute | Type | Notes |
| --- | --- | --- |
| mediaTypeId | VARCHAR2 (50) | This is the primary key. Primary Key; Not Null; |
| type | VARCHAR2 (50) | This the unique type of annotation. Not Null; Unique; |

Model table, Table 15, contains the models of the application, and may include the following model attributes described therein.

TABLE 15

| Attribute | Type | Notes |
| --- | --- | --- |
| modelId | VARCHAR2 (50) | This is the primary key Primary Key; Not Null; |
| modelType | VARCHAR2 (50) | This gives us what kind of model it is, like Internet, ASP, Standalone Unique; |

ObjectPermission table, Table 16, stores the permissions type for the notations and annotations, and may include the following objectPermission attributes described therein.

TABLE 16

| Attribute | Type | Notes |
| --- | --- | --- |
| objectPermissionId | VARCHAR2 (50) | This is the primary key. Primary Key; Not Null; |
| permissionsType | VARCHAR2 (50) | this column stores the permissions for the notations and annotations. Example ReadOnly or CRUD. Not Null; |

OrganisationDetails table, Table 17, stores the information of a organization, and may include the following organisationDetails attributes described therein.

TABLE 17

| Attribute | Type | Notes |
| --- | --- | --- |
| organisationId | VARCHAR2 (50) | This is the primary key. Primary Key; Not Null; |
| organisationName | VARCHAR2 (50) | This column stores the organisation name. Not Null; |
| industryType | VARCHAR2 (100) | This column will have fixed values from a dropdown, can be null. |
| numberOfEmployees | VARCHAR2 (50) | This column stores the range of employees of the co. |
| contactFirstName | VARCHAR2 (50) | This column stores the contact persons first name Not Null; |
| contactLastName | VARCHAR2 (50) | This column stores the contact persons last name Not Null; |
| orgEmail | VARCHAR2 (50) | This column holds the Org Email created by Synchrotext salesperso for org. |
| contactNumber | VARCHAR2 (50) | This column holds the contact number of organisation. Not Null; |
| orgAddress1 | VARCHAR2 (250) | This holds the address details of org. Not Null; |
| orgAddress2 | VARCHAR2 (250) | This holds the continuation of address of org. |
| orgZipCode | VARCHAR2 (50) | This holds the zipcode of org. Not Null; |
| orgCountry | VARCHAR2 (50) | This holds the country of org. Not Null; |
| orgRegisterForAutoNewsletters | VARCHAR2 (1) | This is flag for registration of Auto newsletter. Default is 'Y' Not Null; |
| orgLinkToDisclaimer | VARCHAR2 (50) | This will hold to disclaimer policy Page Not Null; |

TABLE 17-continued

| Attribute | Type | Notes |
|---|---|---|
| roleId | VARCHAR2 (50) | This will associate the features to org. Not Null; |
| orgAcceptanceOfPolicies | VARCHAR2 (1) | This holds the flag value for privacy policies. Default is 'Y'. Not Null; |

PurchaseOrder table, Table 18, stores the order details of the user, and may include the following purchaseOrder attributes described therein.

TABLE 18

| Attribute | Type | Notes |
|---|---|---|
| purchaseOrderId | VARCHAR2 (50) | This is the primary key. Primary Key; Not Null; |
| functionId | VARCHAR2 (50) | This contains the functions purchased by the user. Not Null; |
| quantity | VARCHAR2 (50) | This contains the quantity purchased. Not Null; |
| purchaseDate | DATE | This column holds the date on which the purchase is done. Not Null; |
| transactionNumber | NUMBER (24) | This column stores the transaction number. |
| totalAmount | NUMBER (8, 2) | This amount stores the total amount. Not Null; |
| userId | VARCHAR2 (50) | This is the foreign key. Not Null; |

RoleFunctionAssoc table, Table 19, holds the Premium user association to the Features purchased by him, and may include the following roleFunctionAssoc attributes described therein.

TABLE 19

| Attribute | Type | Notes |
|---|---|---|
| roleId | VARCHAR2 (50) | Foreign Key to role table Primary Key; Not Null; |
| functionId | VARCHAR2 (50) | Foreign Key to functions table Primary Key; Not Null; |

Roles table, Table 20, defines the uses of the system, and may include the following roles attributes described therein.

TABLE 20

| Attribute | Type | Notes |
|---|---|---|
| roleId | VARCHAR2 (50) | Primary Key Primary Key; Not Null; |
| roleName | VARCHAR2 (100) | Name of the Role Not Null; Unique; |

Sinewave table, Table 21, stores the details of sine wave of the media, and may include the following sinewave attributes described therein.

TABLE 21

| Attribute | Type | Notes |
|---|---|---|
| sinewaveId | VARCHAR2 (50) | This is the primary key. Primary Key; Not Null; |

TABLE 21-continued

| Attribute | Type | Notes |
|---|---|---|
| mediaId | VARCHAR2 (50) | This is the mediaId Not Null; |
| sinewavePath | VARCHAR2 (1000) | This column stores path of the sinewave related to the media. |

Transcript table, Table 22, holds the transcript and relevant data of the media, and may include the following transcript attributes described therein.

TABLE 22

| Attribute | Type | Notes |
|---|---|---|
| transcriptId | VARCHAR2 (50) | This is the primary key. Primary Key; Not Null; |
| transcript | BLOB | This column stores transcript in xml format |
| lauguageId | VARCHAR2 (50) | This stores the language reference. Not Null; |
| isSynchronised | VARCHAR2 (1) | This stores whether media's transcript is synchronized. Default is 'N'. Not Null; |
| userId | VARCHAR2 (50) | This refers to user in users table. Not Null; |
| transcriptDate | DATE | This gives us the date of the transcript Not Null; |
| accessId | VARCHAR2 (50) | This refers to access rights table. Not Null; |
| mediaId | VARCHAR2 (50) | Not Null; |
| modifiedBy | VARCHAR2 (50) | This will hold the userId of the person last modified the transcript. |
| isTranslated | VARCHAR2 (1) | This column will give indication whether the transcript is translated. Default is 'N' Not Null; |
| isAutoTranscript | VARCHAR (1) | This column gives us whether the transcript is Auto generated. Default is 'N' Not Null; |
| isAutoSynchronised | VARCHAR2 (1) | This column gives the indication whether the transcript is AutoSynchronised. Default is 'N' Not Null; |
| isAutoTranslated | VARCHAR2 (1) | This column gives us indication whether the translation is AutoTranslation. Default is 'N' Not Null; |

UserFunctionAssoc table, Table 23, holds which function has been purchased by user, and may include the following userFunctionAssoc attributes described therein.

TABLE 23

| Attribute | Type | Notes |
| --- | --- | --- |
| userId | VARCHAR2 (50) | Foreign key to User Primary Key; Not Null; |
| functionId | VARCHAR2 (50) | Foreign key to Function Primary Key; Not Null; |

UserModelAssoc table, Table 24, holds the relation of model to the user, and may include the following userModelAssoc attributes described therein.

TABLE 24

| Attribute | Type | Notes |
| --- | --- | --- |
| accountId | VARCHAR2 (50) | This is the composite primary key. Primary Key; Not Null; |
| userId | VARCHAR2 (50) | This is the composite primary key. Primary Key; Not Null; |

UserObjectPermission table, Table 25, will give us permission details like crud/read-only on the different types of media add-ons like transcript, annotation, etc., and may include the following userObjectPermission attributes described therein.

TABLE 25

| Attribute | Type | Notes |
| --- | --- | --- |
| userId | VARCHAR2 (50) | This gives the userId giving permissions. Not Null; |
| objectId | VARCHAR2 (50) | This could be primary key of Transcript, annotation table. Not Null; |
| userObjectId | VARCHAR2 (50) | This is the primary key. Primary Key; Not Null; |
| objectType | VARCHAR2 (50) | This stores the object type like transcript/annotation. Not Null; |
| mediaId | VARCHAR2 (50) | This is the foreign key. Not Null; |
| objectPermissionId | VARCHAR2 (50) | This column stores the permission id for the object. Not Null; |

Address table, Table 26, stores user Address Details, and may include the following address attributes described therein.

TABLE 26

| Attribute | Type | Notes |
| --- | --- | --- |
| addressId | VARCHAR2 (50) | This is the primary Key. Primary Key; Not Null; |
| userId | VARCHAR2 (50) | Not Null; |
| address1 | VARCHAR2 (100) | Not Null; |
| address2 | VARCHAR2 (100) | |
| address3 | VARCHAR2 (100) | |
| address4 | VARCHAR2 (100) | |
| stateRegion | VARCHAR2 (50) | Not Null; |
| zipCode | VARCHAR2 (12) | Not Null; |
| country | VARCHAR2 (50) | Not Null; |

HintQuestions table, Table 27, contains the hint questions offered to the user, and may include the following HintQuestions attributes described therein.

TABLE 27

| Attribute | Type | Notes |
| --- | --- | --- |
| hintQuestionId | VARCHAR2 (50) | This is the primary key. Primary Key; Not Null; |
| Hintquestion | VARCHAR2 (240) | Not Null; |

PaymentDetails table, Table 28, stores the credit card details of the user, and may include the following PaymentDetails attributes described therein.

TABLE 28

| Attribute | Type | Notes |
| --- | --- | --- |
| paymentId | VARCHAR2 (50) | This is the primary key of the table Primary Key; Not Null; |
| userId | VARCHAR2 (50) | This is the foreign key. Not Null; |
| creditCardType | VARCHAR2 (24) | This column holds the credit card service provider. Not Null; |
| creditCardNo | VARCHAR2 (16) | This column holds the credit card number of the user. Not Null; |
| ccExpiryDate | DATE | This column holds the credit card expiry date. Not Null; |
| authCode | VARCHAR2 (4) | This column holds the auth code of the credit card. Not Null; |
| ccMessage | VARCHAR2 (50) | This column holds the message of the transactions Like success or failure. |
| amount | NUMBER (5, 2) | This column holds the amount of the charged the user. Not Null; |
| purchaseOrderId | VARCHAR2 (50) | This is the foreign key. Not Null; |

Users table, Table 29, contains user's access information, and may include the following Users attributes described therein.

TABLE 29

| Attribute | Type | Notes |
| --- | --- | --- |
| userId | VARCHAR2 (50) | This is the primary key. Primary Key; Not Null; |
| userName | VARCHAR2 (50) | email-Id of user Not Null; Unique; |
| firstName | VARCHAR2 (50) | Not Null; |
| lastName | VARCHAR2 (50) | |
| password | VARCHAR2 (24) | Not Null; |
| dob | DATE | Not Null; |
| gender | VARCHAR2 (12) | This gives us gender of user. Not Null; |
| hintQuestionId | VARCHAR2 (50) | Not Null; |
| hintAnswer | VARCHAR2 (50) | Not Null; |
| promotionCode | VARCHAR2 (24) | |
| flagNewsletters | VARCHAR2 (1) | Y or N Not Null; |
| disclaimer | VARCHAR2 (1) | Y or N Not Null; |
| acceptancePolicy | VARCHAR2 (1) | Y or N Not Null; |
| roleId | VARCHAR2 (24) | Foreign key to roles Not Null; |
| confirmationFromLinkofEmail | VARCHAR2 (1) | Y or N Not Null; |
| registrationDate | DATE | Not Null; |

TABLE 29-continued

| Attribute | Type | Notes |
|---|---|---|
| organisationId | VARCHAR2 (50) | This links user to organization, can be null for free/premium user. |
| emailId | VARCHAR2 (50) | This will store the email id of the user. Not Null; Unique; |

Figure 13:
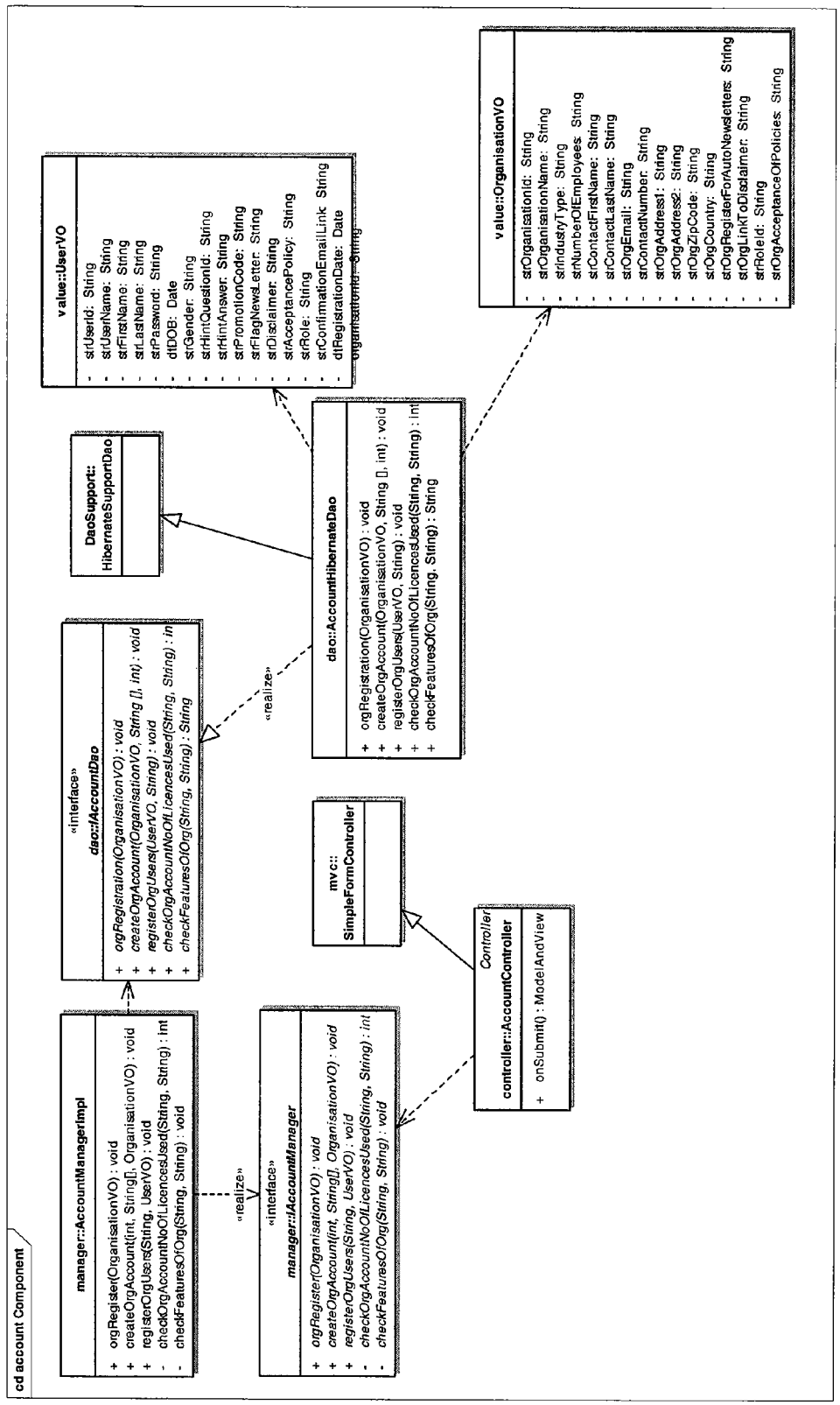
FIG. 13 is an application class diagram of an account component of a system that creates a real-time collaboration and synchronization of disparate media components, in accordance with an embodiment of the present invention.

FIG. 13 is an application class diagram of an account component of a system that creates a real-time collaboration and synchronization of disparate media components, in accordance with an embodiment of the present invention.

Figure 14:
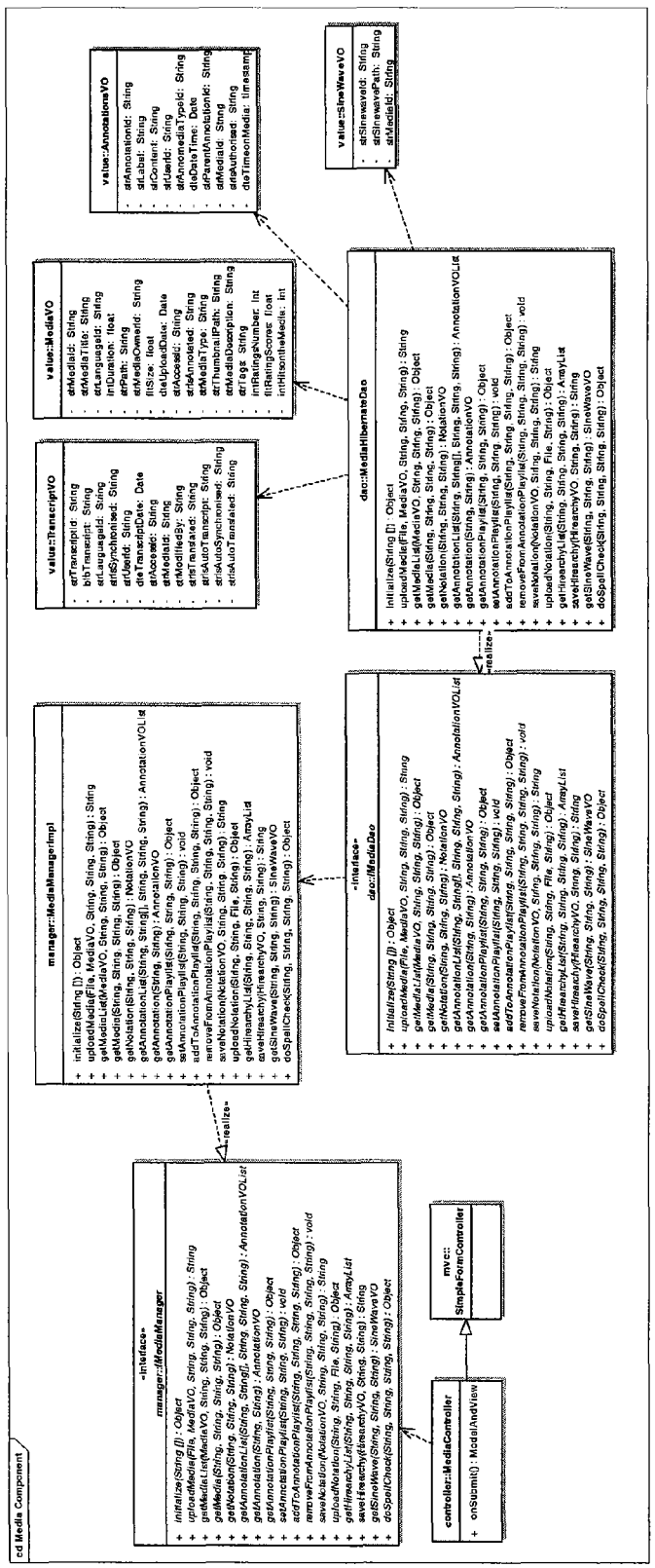
FIG. 14 is an application class diagram of a media component of a system that creates a real-time collaboration and synchronization of disparate media components, in accordance with an embodiment of the present invention.

FIG. 14 is an application class diagram of a media component of a system that creates a real-time collaboration and synchronization of disparate media components, in accordance with an embodiment of the present invention.

Figure 15:
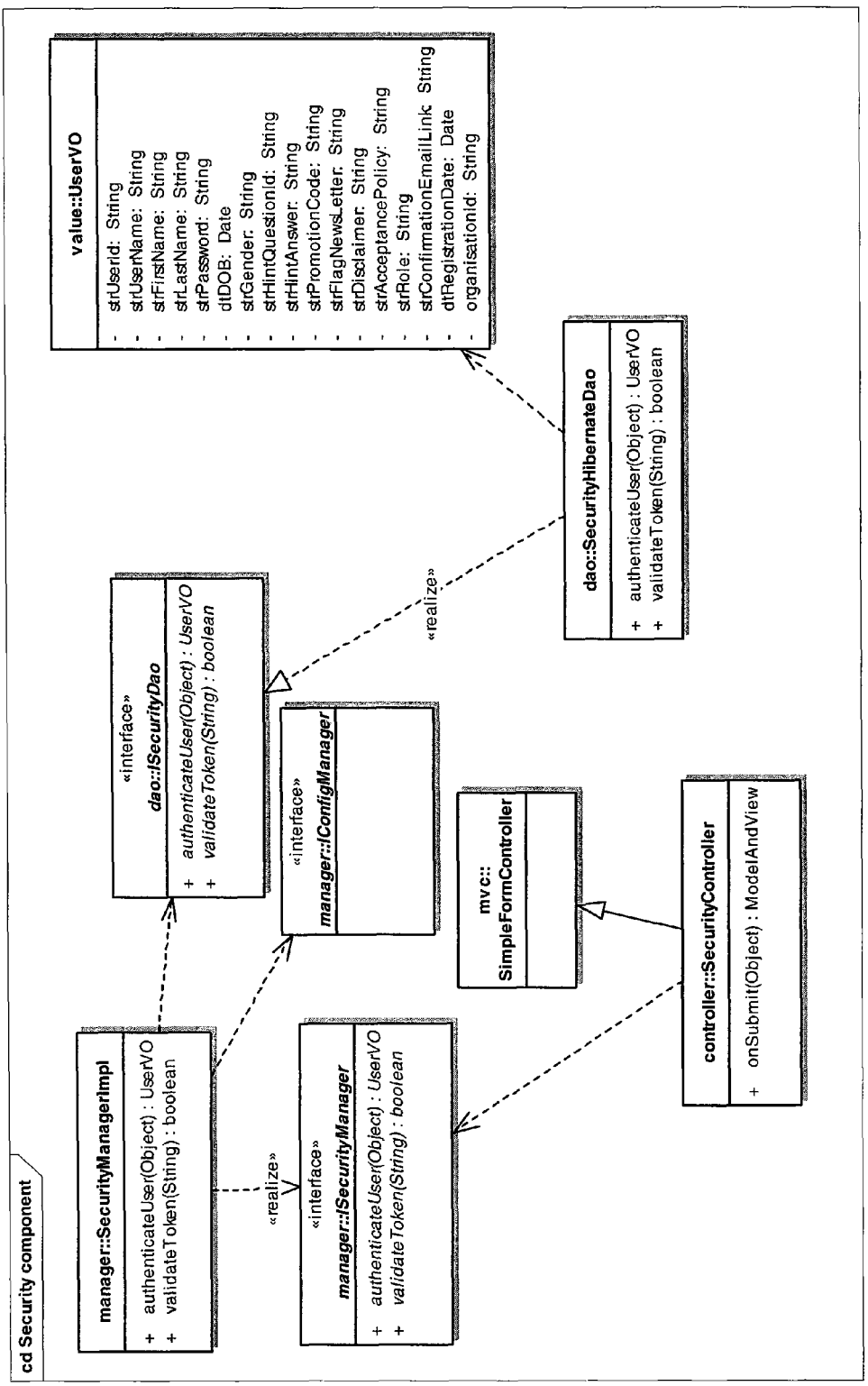
FIG. 15 is an application class diagram of a security component of a system that creates a real-time collaboration and synchronization of disparate media components, in accordance with an embodiment of the present invention.

FIG. 15 is an application class diagram of a security component of a system that creates a real-time collaboration and synchronization of disparate media components, in accordance with an embodiment of the present invention.

Figure 16:
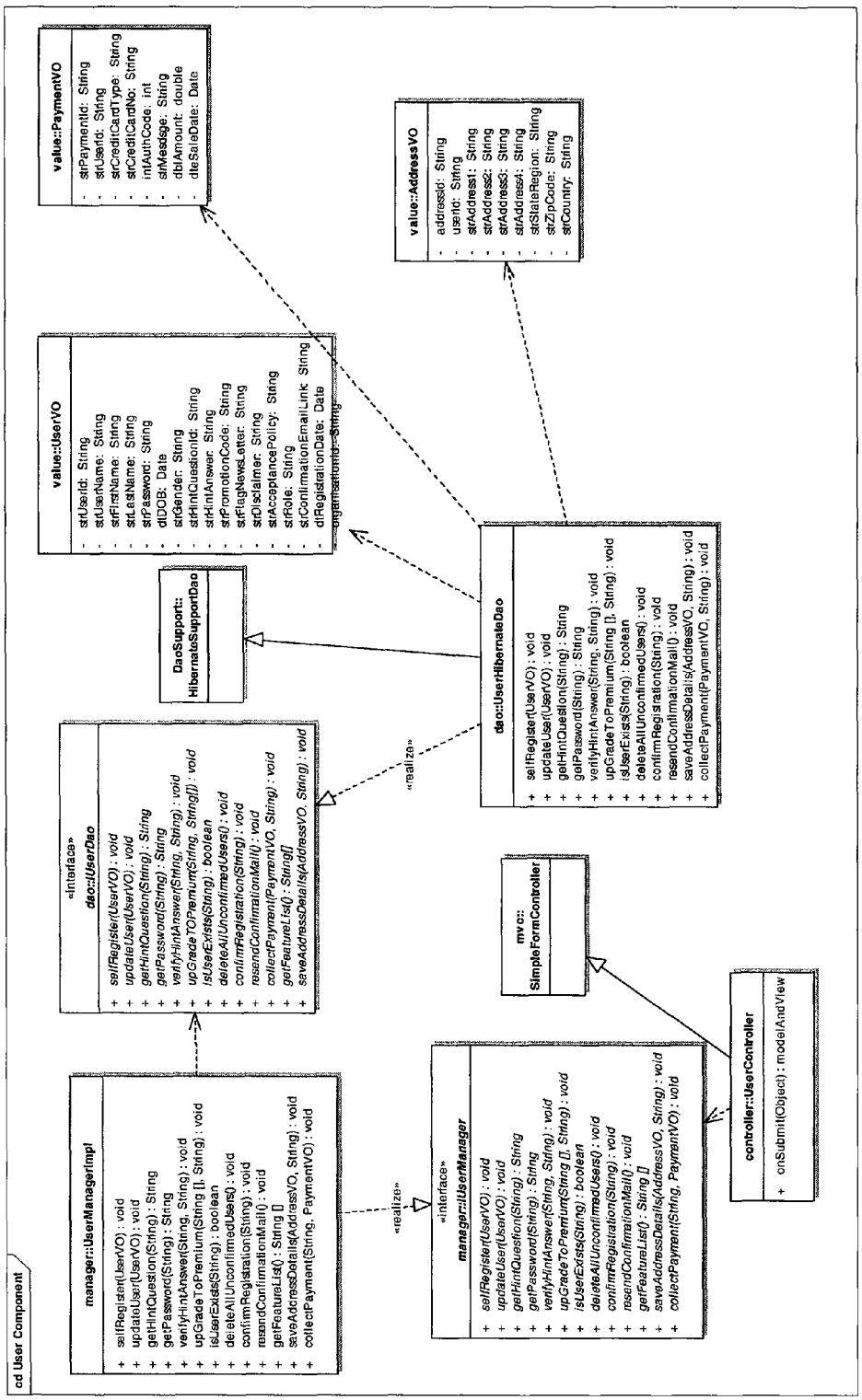
FIG. 16 is an application class diagram of a user component of a system that creates a real-time collaboration and synchronization of disparate media components, in accordance with an embodiment of the present invention.

FIG. 16 is an application class diagram of a user component of a system that creates a real-time collaboration and synchronization of disparate media components, in accordance with an embodiment of the present invention.

Figure 17:
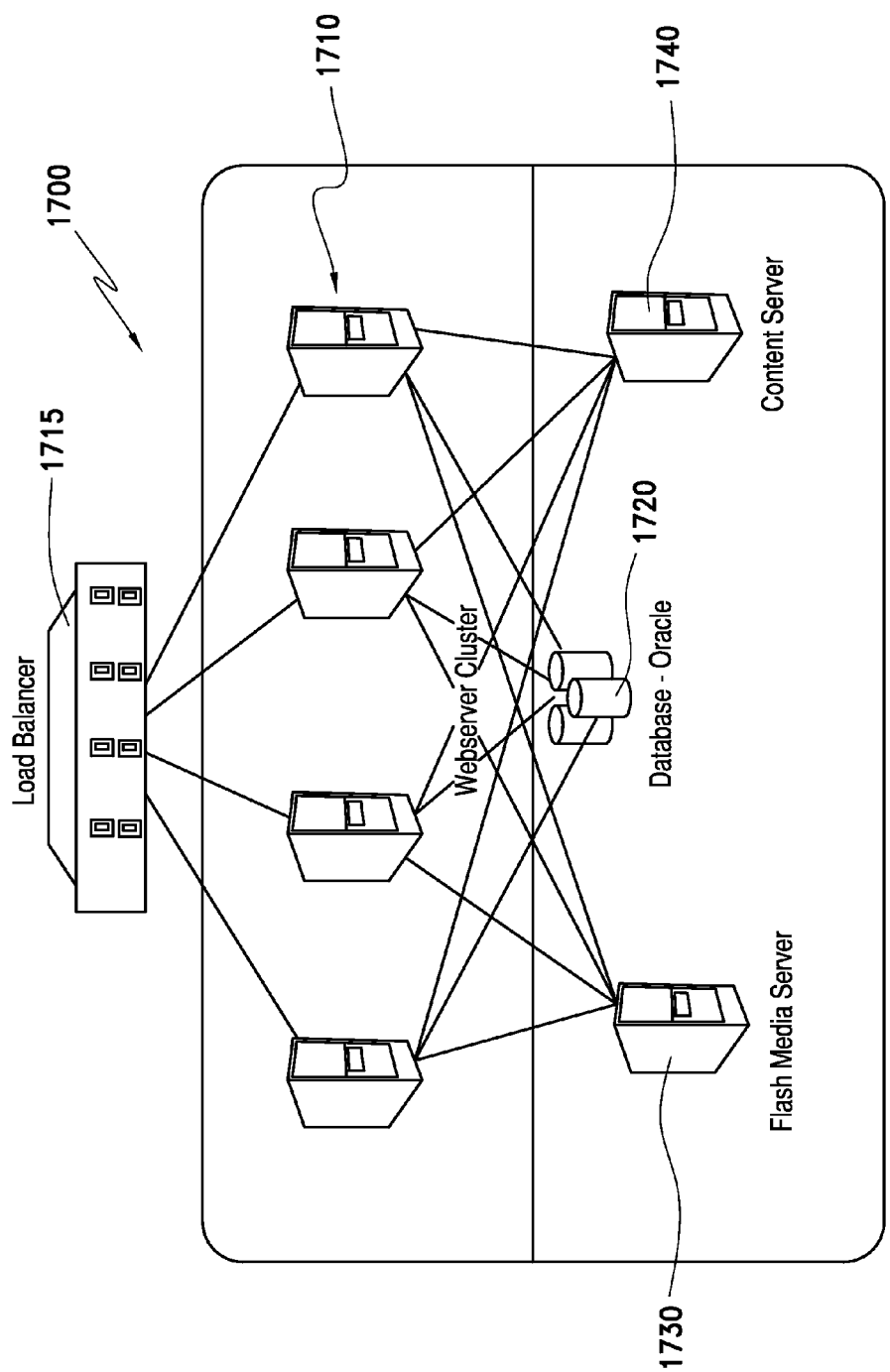
FIG. 17 is a system configuration diagram of a cluster, client-server implementation of a system that creates a real-time collaboration and synchronization of disparate media components, in accordance with an embodiment of the present invention.

FIG. 17 is a system configuration diagram of a cluster, client-server implementation of a system that creates a real-time collaboration and synchronization of disparate media components, in accordance with an embodiment of the present invention. It is expected that clustering will be required in the future when the load on the system application increases and as the need to handle enormously high amounts of requests from clients all over the globe increases. The clustering highlighted in FIG. 17 may be applicable for Internet, i.e., Tubelinx.net and for ASP, i.e., VioSync.org. In FIG. 17, a system 1700 is shown to include a cluster of multiple webservers 1710, where each is connected to a load balancer 1715, which acts to try to evenly balance the work-load between each of the webservers 1710. In addition to the webservers 1710, system 1700 includes a database 1720, a Flash Media server 1730 and a content server 1740 connected to each of the webservers 1710.

Client machine requirements. In accordance with one or more embodiments of the present invention, each client machine should have at least 512 MB of RAM installed; be running Windows XP, Windows 2000, or Windows 2003 operating system; have Internet Explorer 6.0.28+, Firefox 1.0.12, and Flash plug in: Flash 9.0-player plug installed; and have a display screen resolution of 1024×728 pixels. For Internet and ASP/Client-server model clients, they should also have the following additional software installed: Licensed Software—Flex Media Server 2, Flex Builder 2.0, and Oracle 10g database server; and Open Source Software—JDK 1.4 or above version, Spring Framework 2.1., Hibernate 3.0., Cairngorm Framework (Open Source), Resin Application server (Resin licenses), and Log4J—Apache Open source license.

For Standalone systems, the following Open Source Software should be installed: JDK 1.4 or above version, Spring Framework 2.1, Hibernate 3.0, Cairngorm Framework (Open Source), Resin Application server (Resin licenses), Log4J—Apache Open source license, and MySql (database).

Figure 18:
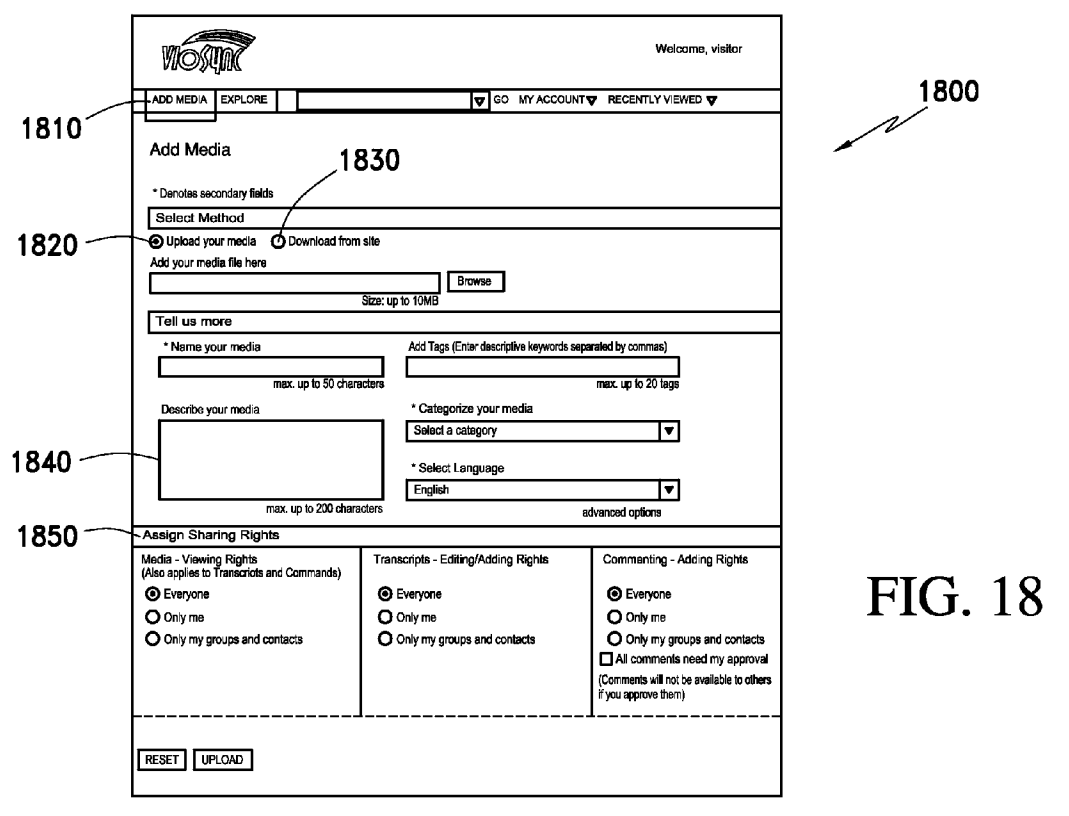

FIG. 18 is a portion of an add media screen that may be used by individual users to upload and/or download media files, in accordance with an embodiment of the present invention. In FIG. 18, an add media screen 1800 is shown that may be activated by a user clicking on an Add Media menu tab 1810 on a menu bar to view the screen. The user can either chose to Upload your media 1820 or Download media 1830 from an external Web site. The user may also provide some general information on the media file in box 1840, assign viewing and editing rights to the media in an assign rights section 1850 of the media screen 1800. In general, if a user chooses to download media from an external Web site, they should select a Disclaimer check box. To complete the selected action, the user merely need click an Upload button 1860.

Figure 19:
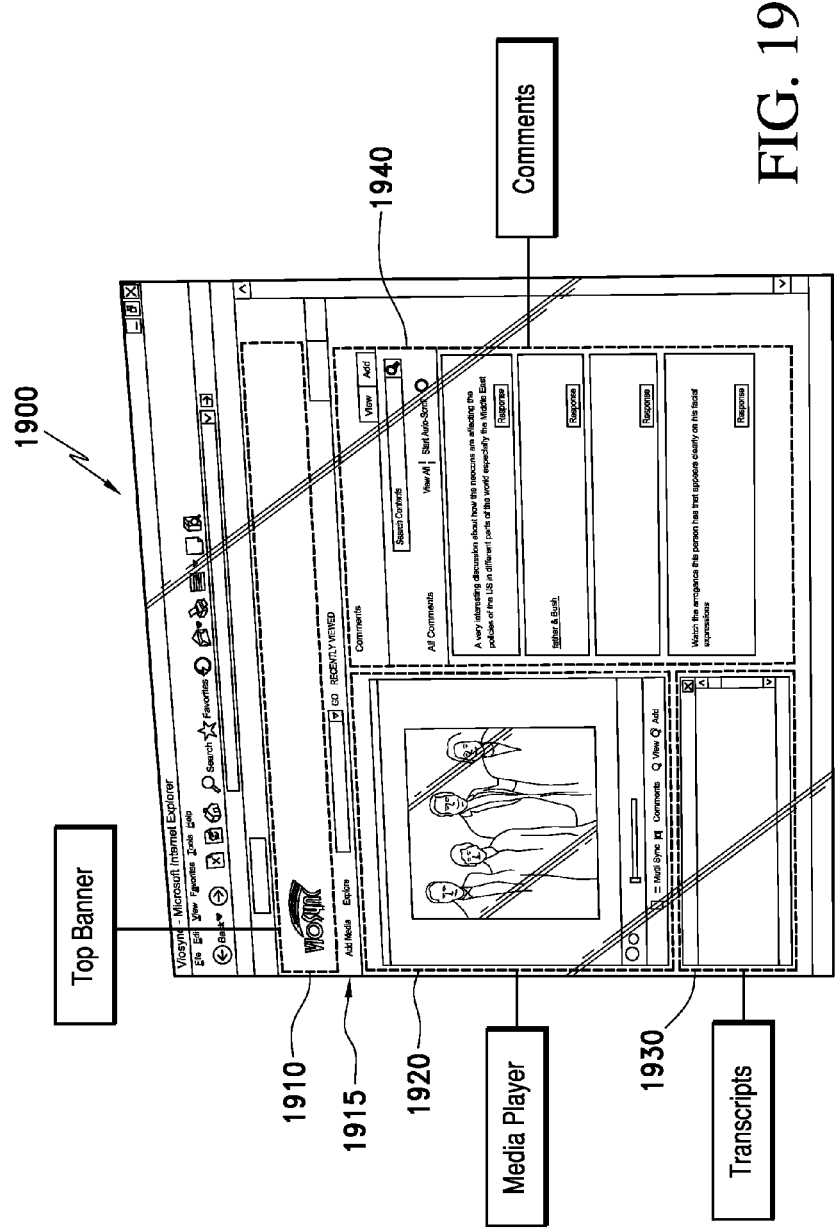
FIG. 19 is a general screen that may be used by users to access features of the system to create real-time collaboration and synchronization of disparate media components, in accordance with an embodiment of the present invention.

FIG. 19 is a general screen that may be used by users to access features of the system to create real-time collaboration and synchronization of disparate media components, in accordance with an embodiment of the present invention. In FIG. 19, general screen 1900 is shown that may be used to access features of the system. In the general screen 1900 there are several sections, the first of which is a banner section 1910 at the top of the screen that is above a menu bar 1915. The menu bar 1915 includes functional tabs that provide access to features of the system. Below the menu bar 1915 is a Media player window 1920 in which the media content is displayed and accessed. Immediately below the Media player window 1920 is a Transcripts window 1930 that holds the transcript information that is synced to the media content in the Media player window 1920. To the right of both the Media player window 1920 and the Transcripts window 1930 is a Comments window 1940

Figure 20:
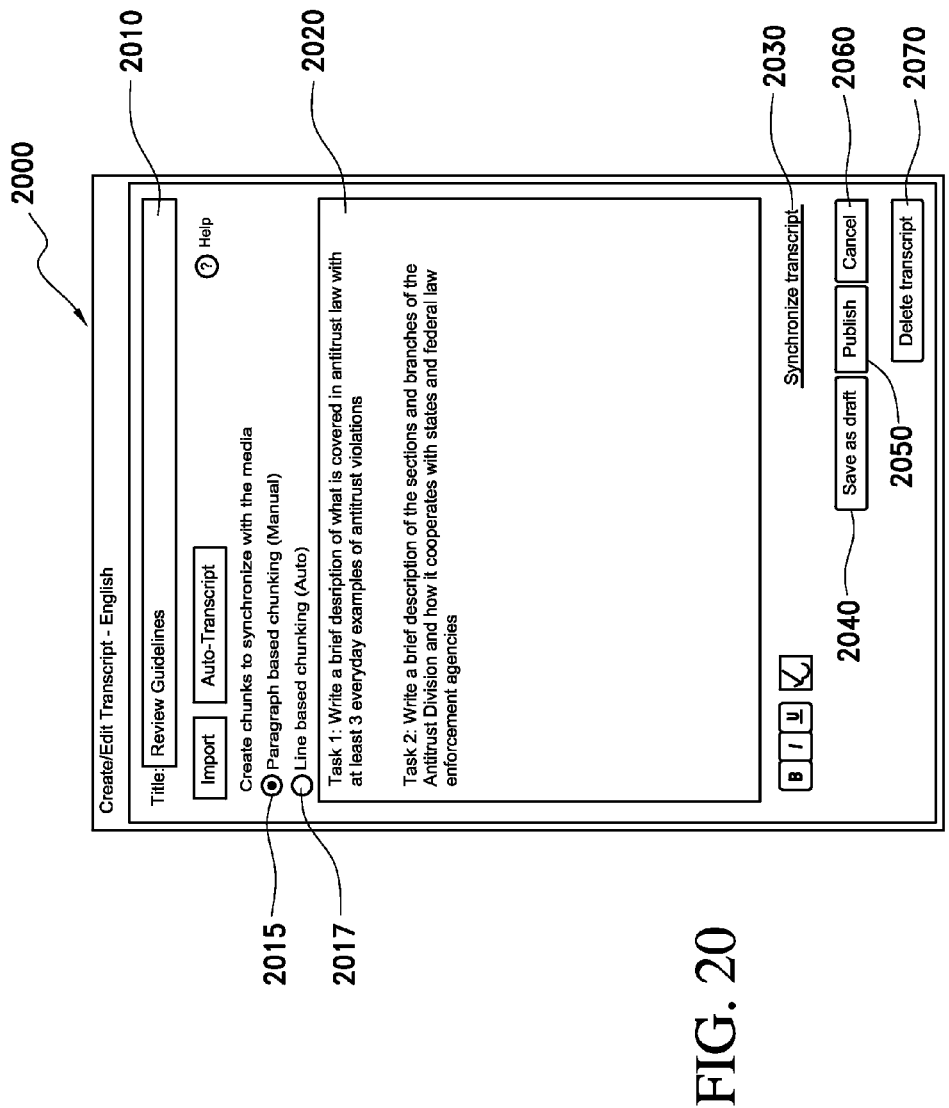
FIG. 20 is a create/edit transcript screen that may be used by organizational users to create and/or edit transcripts for multi-syncing with media files, in accordance with an embodiment of the present invention.

FIG. 20 is a create/edit transcript screen that may be used by organizational users to create and/or edit transcripts for multi-syncing with media files, in accordance with an embodiment of the present invention. In FIG. 20, a create/edit transcript screen 2000 is shown that may be used by a user to create and/or edit transcripts for multi-syncing with media files. To create a transcript, on a Create menu below the video on the left, click English. This will open the create/edit transcript screen 2000. In a Title field 2010, the user may type an appropriate title for the transcript (title can not exceed 50 characters). For example, the user could type the text 'Review guidelines'. The user may then choose between: Paragraph based chunking 2015 or line based chunking 2017. Line based chunks are automatically created by the system. Since paragraph based chunking 2015 was selected, the user types a new transcript in transcript window 2020. To precisely synchronize the transcript with the media, the user would click the Synchronize transcript link 2030. Clicking the Save as draft button 2040 will save the transcript as a draft, should the user wish to come back to the draft later, otherwise clicking the Publish button 2050 will publish the transcript. Clicking a Cancel button 2060 will cancel the creation of the transcript and clicking a Delete button 2070 will delete the transcript from the system.

FIG. 21 is an auto transcript creation screen that may be used by to automatically create transcripts from the audio portion of a media file, in accordance with an embodiment of the present invention. In FIG. 21, an auto transcript creation screen 2100 is shown that may be used to initiate the creation of an automatic transcript from a media file. The system provides a speech-recognition capability to convert the speech in a video media file to a text format. Unfortunately, the system can not guarantee the accuracy of the generated transcripts, since the quality of the audio portion of the media file will greatly effect the quality of the transcript that will be produced. Therefore, each user should check the accuracy of any automatically created transcripts before they are published. The quality is affected by the quality of the original recording and clarity of the speaker. Before using the facility, it is important for the user to remember to answer the following questions: What accent do you intend to use? What medium do you intend to use for recording the media? Do the media belong to the medical industry?

In general the following guidelines should be used to choose the medium used for recording. BestMatch III: 11 Khz to 99 kHz sampling rates. Use this model for text recorded with a headset or hand-held microphones or a recording device. BestMatch Array: 11 Khz to 99 kHz sampling rates. Use this model for text recorded with an array microphone and then having the recording transcribed on the server. Medical Telephony: 8 Khz to 99 kHz sampling rates. Use this model for text recorded over the telephone or a recording device and then having the recording transcribed on the server. Audiomining Telephony: 8 Khz to 99 kHz sampling rates. Use this model for text recorded over the telephone or a hand-held digital recorder and used for creating an index file mainly for searching. Audiomining Broadcast: 8 Khz to 99 kHz sampling rates. Use this model for transcribing from audio or video broadcast sources Bluetooth 8 Khz: 8 Khz sampling rate. Use this model for transcribing audio from Bluetooth devices. Speaker Independent 8 Khz: 8 Khz sampling rate. Use this model for near real-time speaker independent recognition from telephony files.

Figure 22:
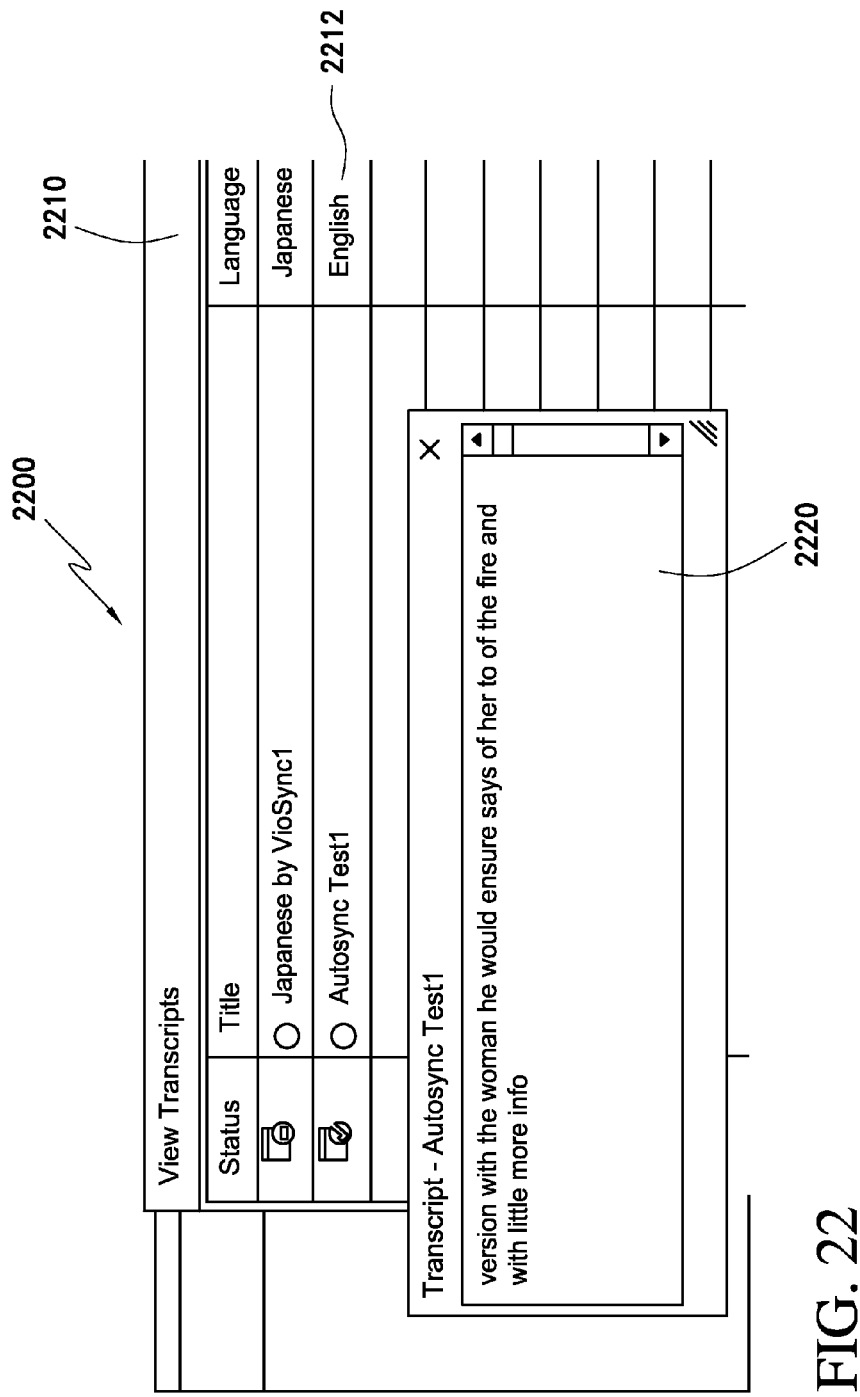
FIG. 22 is a view transcripts screen, in accordance with an embodiment of the present invention.

FIG. 22 is a view transcripts screen, in accordance with an embodiment of the present invention. In FIG. 22, a view transcripts screen 2200 is shown that may be used to view saved transcripts in the system. To view the available transcripts, the user clicks View on the Transcripts menu in the media player. This will open the transcript view popup 2210 and clicking on the Autosync Test1 line 2212 will open the transcript window 2220 in which the transcript of Autosync Test1 line 2212 will be displayed.

Figure 23:
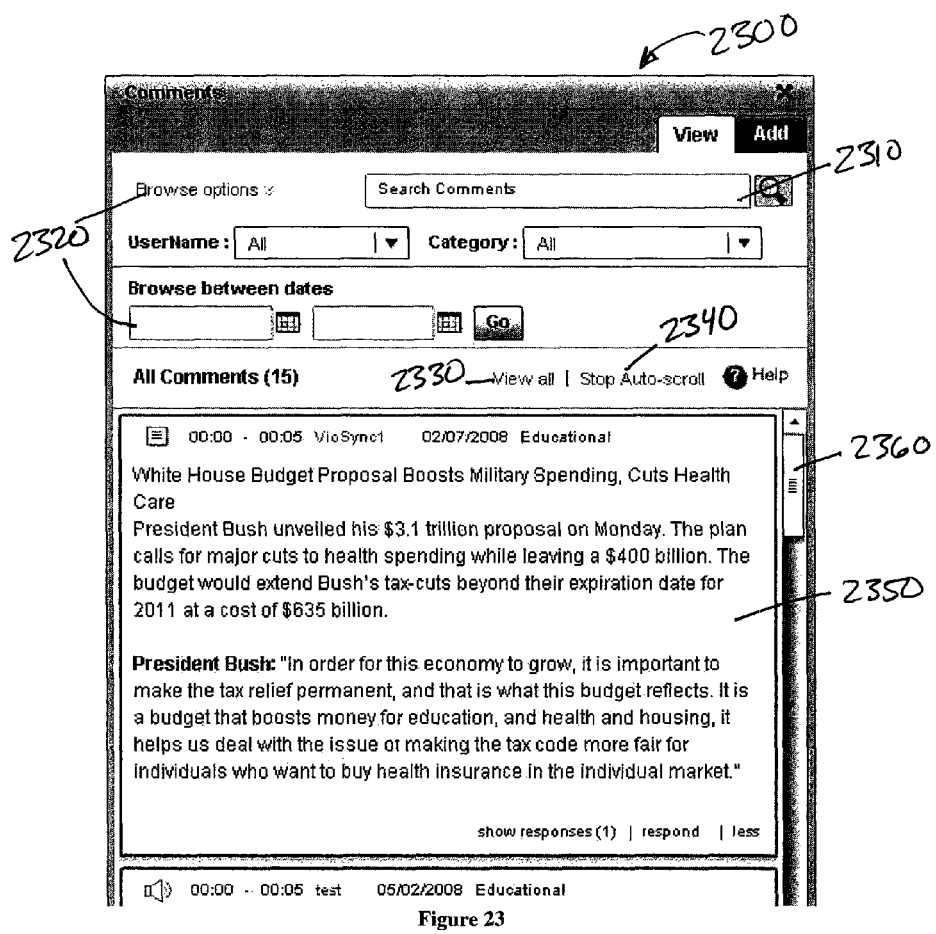
FIG. 23 is a comments screen that may be used by individual users to view and add comments to a media file, in accordance with an embodiment of the present invention.

FIG. 23 is a comments screen that may be used by individual users to view and add comments to a media file, in accordance with an embodiment of the present invention. In FIG. 23, a comments screen 2300 is shown that may be used to view and add comments to multi-synced media files on the system servers. To view comments, the user clicks on the View button in the menu line of the media player to open the View Comments screen 2300. The Search Comments facility 2310 allows users to look for a comment from a particular user or related to a specific category. The Browse facility 2320 allows users to look for a comment in a date range. The View All option 2330 allows users to view all comments. The Auto-scroll facility 2340 causes the comment(s) related to a particular segment to come up in a comments window 2350 in spite of a scroll bar 2360.

Figure 24:
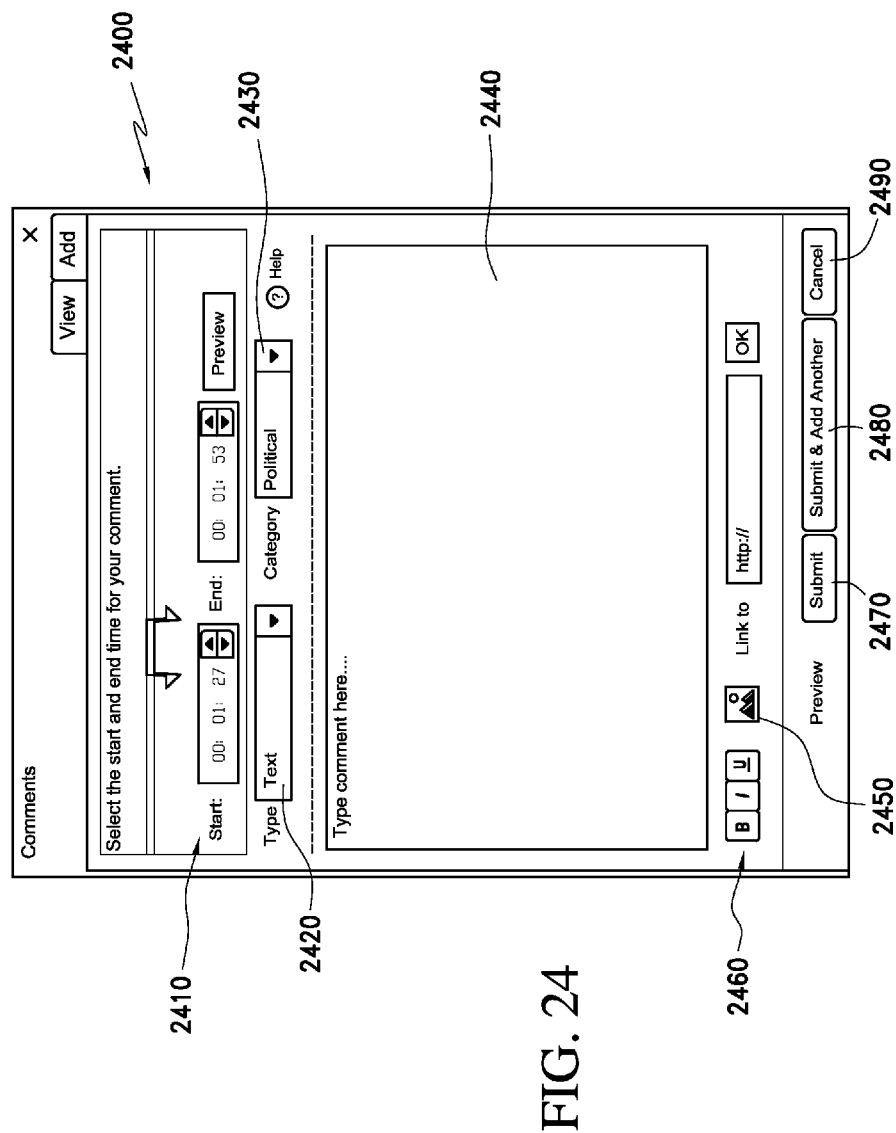
FIG. 24 is an add a text comment screen in which a user may type a personal comment for syncing with a media file, in accordance with an embodiment of the present invention.

FIG. 24 is an add a text comment screen in which a user may type a personal comment for syncing with a media file, in accordance with an embodiment of the present invention. In FIG. 24, an add a text comment screen 2400 is shown that may be used by a user to type a comment for syncing with a media file. The user first selects the start and end time 2410 for the comment to be displayed during the display of the media file. The user then selects the type of comment 2420 using a pull down menu and selects a category for the comment from a second pull down menu 2430. The use may then type in or copy and paste a Text comment into a comment window 2440. To add an image the user may click on the mountain and sun icon 2450 located just to the left of a "Link to" box, and browse for an image to insert and follow the instructions. The user can highlight any text within a comment and hyperlink it to another webpage in the internet by copying/typing its URL and clicking OK. The format buttons 2460 (Bold, Italics, Underline) may be used to enhance any comment. Once the comment is completed the user has the option of selecting a Submit button 2470, Submit & Add Another comment button 2480, or a Cancel button 2490 and not save the comment.

Figure 25:
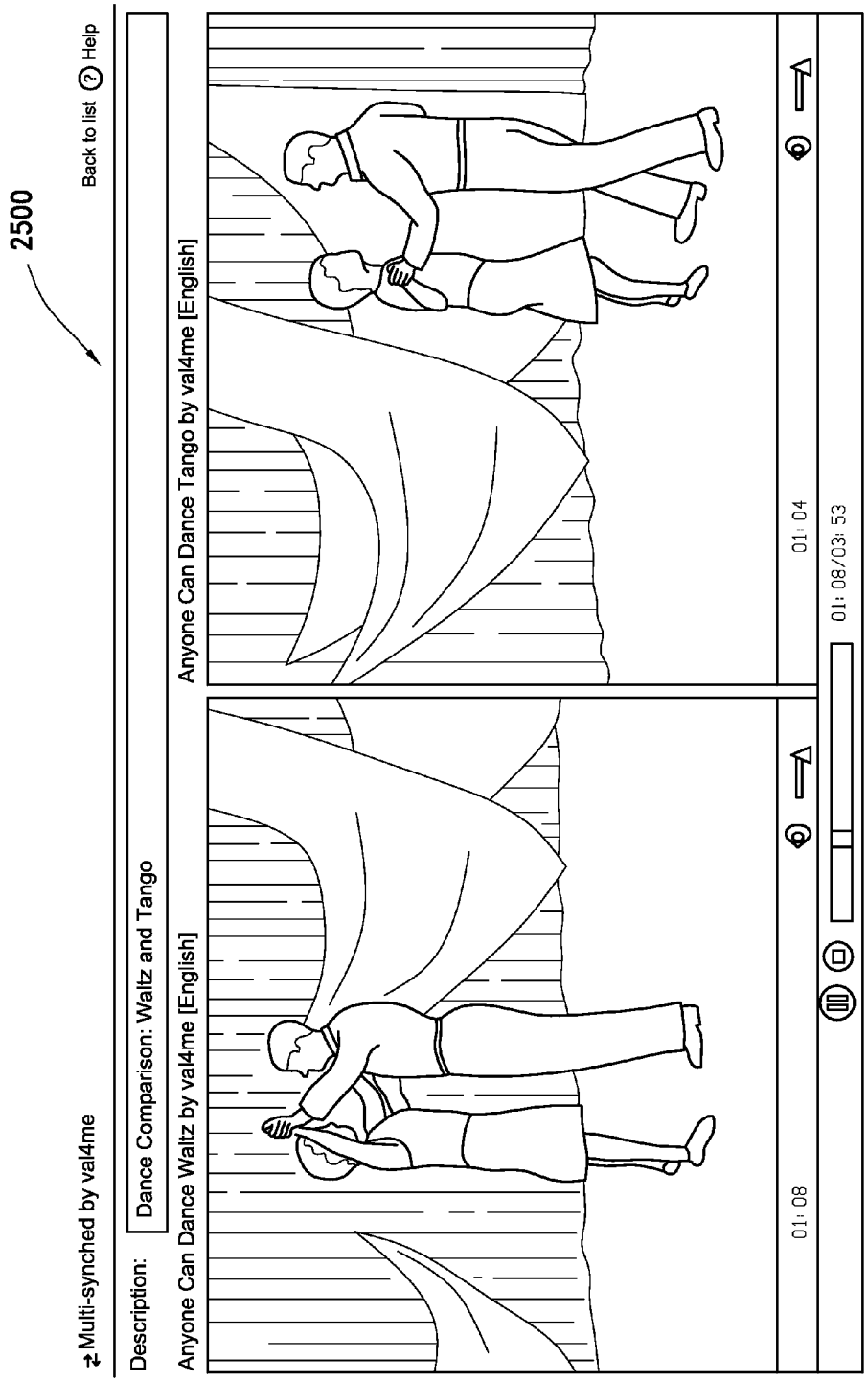
FIG. 25 is a multi-synced screen that is used to view a multi-synced media file, in accordance with an embodiment of the present invention.

FIG. 25 is a multi-synced screen that is used to view a multi-synced media file, in accordance with an embodiment of the present invention. In FIG. 25, a multi-synced screen 2500 is shown that may be used by a user to view multi-synced media files. Clicking the Multi-Sync link on the media player will open a Multi-Sync window from which a user may select a multi-synced media file for viewing. For example, the user may select the media file by clicking on a media thumbnail in the multi-sync window, which will play the two media clips shown in the multi-synced screen 2500.

System Hardware Requirements. The system may include an application server connected to each of a database server, a content+cache serve, and a flash media server. For the Application server, in general, the server may include a machine with an Intel Dual XEON 3.2 GHz w/HT; 4 gigabytes (GB) of RAM; Windows 2003 Standard Operating System (OS); and a 250 GB hard drive. For the Database server, in general, the server may include a machine with an Intel Pentium 4-3.06 GHz w/HT; 4 GB of RAM; Windows 2003 Standard OS; and a 250 GB hard drive. For the Content+Cache server, in general, the server may include a machine with an Intel Pentium 4—3.06 GHz w/HT; 4 GB of RAM; Windows 2003 Standard OS; and a dual 250 GB SATA hard drive (upgradeable to higher range) in a RAID 5 configuration. For the Flash Media Server, in general, the server may include a machine with an Intel Pentium 4—3.06 GHz w/HT; 8 GB of RAM; Windows 2003 Standard OS; and a 250 GB hard drive.

While the above system configuration only includes a single application server, embodiments are contemplated in which multiple application servers may be used with each being connected to each of a database server, a content+cache serve, and a flash media server. FIG. 17, described above, shows a cluster of application servers connected to a database server, a content+cache serve, and a flash media server. In FIG. 17, an optional load balancer may be connected to the cluster of application servers and acts to spread the work load and requests from the database server, content+cache serve, and flash media server evenly across the cluster of application servers. In general, the clustering likely will be used when the load on the application increases and the system needs to handle an enormously high amount of requests from clients all over the globe. The clustering highlighted in the above diagram will be applicable for Internet, i.e., Tubelinx.net and for ASP, i.e., VioSync.org.

Client Hardware Requirements. The client machine may, in general, include at least 512 MegaBytes (MB) of RAM; use Windows XP, Windows 2000, or Windows 2003 OS; have Internet Explorer 6.0.28+, Firefox 1.0.12; and Flash 9.0-player plug in installed; and have a display with a screen resolution of 1024×728 pixels.

Software Requirements. For an Internet and ASP/Client-server Model, the Licensed Software may include: Flex Media Server 2, Flex Builder 2.0, and Oracle 10g or higher database server. The open source software Requirements for the Internet and ASP/Client-server Model include: JDK 1.4 or above version, Spring Framework 2.1., Hibernate 3.0., Cairngorm Framework (Open Source), Resin Application server (Resin licenses), and Log4J—Apache Open source license. For a standalone server, the open source software Requirements for the Internet and ASP/Client-server Model include: JDK 1.4 or above version, Spring Framework 2.1., Hibernate 3.0., Cairngorm Framework (Open Source), Resin Application server (Resin licenses), and Log4J—Apache Open source license, and MySq1 (database).

In accordance with an embodiment of the present invention, a method including displaying media available for multi-syncing; receiving a first media selection; displaying a view media screen with the first media selection; receiving a request to create multi-sync with first media; displaying a create multi-sync form with multi-sync options; receiving a selection of a multi-sync option; displaying at least one second media; receiving a selection of a second media to multi-sync with the first media;

receiving request to create multi-sync link; and displaying the two media that have been chosen for multi-syncing. The method may continue and, if the received multi-sync option is for a time-based multi-syncing, then receiving a description for and a selection of segments of equal time duration from each of the first and second media; and creating a multi-sync work from the selection of segments of equal time duration from the first and second media. However, if the received multi-sync option is for transcript-based multi-syncing, then the method may continue by receiving a description for a selection of segments and selecting transcripts for each of the first and second media; displaying the selected transcripts next to each other; until no more matching portions of each transcript are received, receiving matching portions of each transcript; and creating a multi-sync work from the matching portions of each transcript from the first and second media. The method may continue by, if a request is received to preview the multi-synced media, displaying a preview synchronized media screen with both multi-synced media, and if a user request is received to edit the synchronized media, permitting the editing of the multi-synced media, and displaying a view multi-synced media screen with the edited multi-synced media. If a user request is received to exit the synchronized media, the method may continue by saving the multi-synced media, and displaying a view multi-synced media screen. However, if a user request is received to cancel the multi-synced media, the method may continue by canceling the multi-syncing of the two media, and displaying the view media screen.

While the present invention has been described in conjunction with a number of embodiments, the invention is not to be limited to the description of the embodiments contained herein, but rather is defined by the claims appended hereto and their equivalents. It is further evident that many alternatives, modifications, and variations would be or are apparent to those of ordinary skill in the applicable arts. Accordingly, all such alternatives, modifications, equivalents, and variations that are within the spirit and scope of this invention.

What is claimed is:

1. A method, comprising:
   receiving, via a network, a media selection in connection with a first media associated with a media file;
   receiving, via the network, a media selection in connection with a second media associated with a media file;
   receiving, via the network, a multi-sync request associated with the media selection for the first media and the media selection for the second media; and
   when the multi-sync request is a time-based multi-sync request, then
      receive, via the network, a selection of a segment of the first media and a selection of a segment of the second media;
      automatically detect whether a duration of the segment of the first media is equal to a duration of the segment of the second media;
      when the duration of the segment of the first media is detected as being equal to the duration of the segment of the second media, then automatically enable time-based synching as a default to generate a dynamic media link and multi-sync data based on the selection of the segment of the first media and the selection of the segment of the second media, without affecting an integrity of the first media and an integrity of the second media, the dynamic media link being a hyperlink;
      send the multi-sync data such that the multi-sync data is stored in a relational database at a relational database server after the multi-sync data is generated; and
      send, via the network, the dynamic media link such that the segment of the first media and the segment of the second media are displayed and synchronously played side-by-side in a user-editable form based on the multi-sync data stored in the relational database, after receiving an indication that the dynamic media link was selected, the user-editable form being received from a media server, the user-editable form allowing a user to edit synchronization points between the first media and the second media.

2. The method of claim 1, wherein the dynamic media link is a first dynamic media link,
   when the multi-sync request is a text-based multi-sync request, then
      receive the selection of the segment of the first media, a selection of a text for the segment of the first media, the section of the segment of the second media, and a selection of a text for the segment of the second media;
      match a portion of the text for the segment of the first media and a portion of the text for the segment of the second media to produce a synchronized text pair;
      generate a second dynamic media link based on the synchronized text pair, without affecting an integrity of the first media and an integrity of the second media; and
      send the second dynamic media link such that the synchronized text pair is displayed in a user-editable form when the second dynamic media link is selected.

3. The method of claim 1, wherein, if a request is received to preview the multi-synced media, sending a signal such that a preview synchronized media screen with both multi-synced media is displayed.

4. The method of claim 3, wherein the sending the signal such that the preview synchronized media screen with both multi-synced media is displayed includes:
   sending a signal such that the preview synchronized media screen with both multi-synced media displayed side by side is displayed; and
   if a request to play one of the two multi-synced medias is received, sending a signal such that the two multi-synced medias are playing simultaneously where an audio portion of the requested multi-synced media is played with the two multi-synced medias.

5. The method of claim 1, wherein:
   the selection of the first media is a first selection of the first media, the selection of the second media is a first selection of the second media, the dynamic media link is a first dynamic media link, the multi-sync data is first multi-sync data,
   if an authorized user request is received to edit the first selection of the first media and the first selection of the second media:

receiving a second selection of the first media and a second selection of the second media;

generating a second dynamic media link and second multi-sync data based on the second selection of the first media and the second selection of the second media, without affecting the integrity of the first media and the integrity of the second media;

storing the second multi-sync data in the relational database after the second multi-sync data is generated; and sending a signal such that the second segment of the first media and the second selection of the second media are synchronously displayed based on the second multi-sync data.

6. The method of claim 1, wherein if a user request is received to exit the synchronized media:

saving the multi-synced media, and sending a signal such that a view multi-synced media screen is displayed.

7. The method of claim 1, wherein if a user request is received to cancel the multi-synced media:

canceling the multi-syncing of the two media, and sending a signal such that the view media screen is displayed.

8. The method of claim 1, wherein the dynamic media link represents an edited version of the synchronization points between the first media and the second media.

* * * * *